US008736779B2

(12) United States Patent
Horiuchi et al.

(10) Patent No.: US 8,736,779 B2
(45) Date of Patent: May 27, 2014

(54) ACTIVE MATRIX SUBSTRATE, LIQUID CRYSTAL DISPLAY PANEL, LIQUID CRYSTAL DISPLAY DEVICE, METHOD FOR MANUFACTURING ACTIVE MATRIX SUBSTRATE, METHOD FOR MANUFACTURING LIQUID CRYSTAL DISPLAY PANEL, AND METHOD FOR DRIVING LIQUID CRYSTAL DISPLAY PANEL

(75) Inventors: Satoshi Horiuchi, Osaka (JP); Takaharu Yamada, Osaka (JP); Yuhko Hisada, Osaka (JP); Ryohki Itoh, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 624 days.

(21) Appl. No.: 13/127,846

(22) PCT Filed: Aug. 7, 2009

(86) PCT No.: PCT/JP2009/064029
§ 371 (c)(1),
(2), (4) Date: May 5, 2011

(87) PCT Pub. No.: WO2010/058635
PCT Pub. Date: May 27, 2010

(65) Prior Publication Data
US 2011/0242073 A1    Oct. 6, 2011

(30) Foreign Application Priority Data
Nov. 19, 2008    (JP) .................................. 2008-295725

(51) Int. Cl.
*G02F 1/1343*    (2006.01)

(52) U.S. Cl.
USPC ............................................... 349/38; 349/39

(58) Field of Classification Search
USPC ....................................................... 349/38, 39
See application file for complete search history.

(56) References Cited

U.S. PATENT DOCUMENTS

| 5,953,088 A | 9/1999 | Hanazawa et al. |
| 2003/0043336 A1 | 3/2003 | Sasaki et al. |

(Continued)

FOREIGN PATENT DOCUMENTS

| JP | 2003-149647 | 5/2003 |
| JP | 2003-177408 | 6/2003 |

(Continued)

OTHER PUBLICATIONS

International Search Report for PCT/JP2009/064029, mailed Sep. 15, 2009.

*Primary Examiner* — Bumsuk Won
*Assistant Examiner* — Ryan Crockett
(74) *Attorney, Agent, or Firm* — Nixon & Vanderhye, P.C.

(57) ABSTRACT

A high-quality display is achieved by suppressing a disturbance in alignment in a liquid crystal display panel including a substrate structured so that a slit in a pixel electrode intersects with a scanning signal line or an auxiliary capacitor line. An active matrix substrate (10) includes: a pixel electrode (12) having a slit; and an auxiliary capacitor line (14). In a region of intersection between the slit (15) and the auxiliary capacitor line (14) or a scanning signal line (21), at least a drain line (13) or a data signal line (22) is provided between a layer of the pixel electrode (12) and a layer of the auxiliary capacitor line (14) or of the scanning signal line (21) in such a way as to cover the auxiliary capacitor line (12) or the scanning signal line (21).

25 Claims, 12 Drawing Sheets

(56) References Cited

U.S. PATENT DOCUMENTS

| | | |
|---|---|---|
| 2003/0067579 A1 | 4/2003 | Inoue et al. |
| 2003/0095229 A1 | 5/2003 | Inoue et al. |
| 2004/0169790 A1 | 9/2004 | Inoue et al. |
| 2004/0174471 A1 | 9/2004 | Nakanishi et al. |
| 2004/0189917 A1 | 9/2004 | Tanaka et al. |
| 2004/0246406 A1 | 12/2004 | Inoue et al. |
| 2004/0263719 A1 | 12/2004 | Inoue et al. |
| 2005/0018105 A1 | 1/2005 | Inoue et al. |
| 2005/0024556 A1 | 2/2005 | Nakahata et al. |
| 2005/0030445 A1 | 2/2005 | Inoue et al. |
| 2005/0110924 A1 | 5/2005 | Kim et al. |
| 2006/0033852 A1* | 2/2006 | Kim ................................ 349/38 |
| 2006/0131582 A1* | 6/2006 | Jeon et al. ........................ 257/59 |
| 2006/0158575 A1* | 7/2006 | Shin et al. ....................... 349/38 |
| 2006/0244881 A1 | 11/2006 | Sasaki et al. |
| 2007/0195214 A1 | 8/2007 | Chung et al. |
| 2007/0206125 A1* | 9/2007 | Lee .................................. 349/38 |
| 2007/0211187 A1 | 9/2007 | Misaki et al. |
| 2008/0143903 A1* | 6/2008 | Ahn ................................. 349/38 |
| 2008/0316406 A1 | 12/2008 | Inoue et al. |
| 2009/0185092 A1* | 7/2009 | Park et al. ....................... 349/39 |
| 2010/0035504 A1 | 2/2010 | Sasaki et al. |

FOREIGN PATENT DOCUMENTS

| | | |
|---|---|---|
| JP | 2005-134889 | 5/2005 |
| JP | 2006-178445 | 7/2006 |

* cited by examiner

F I G. 5
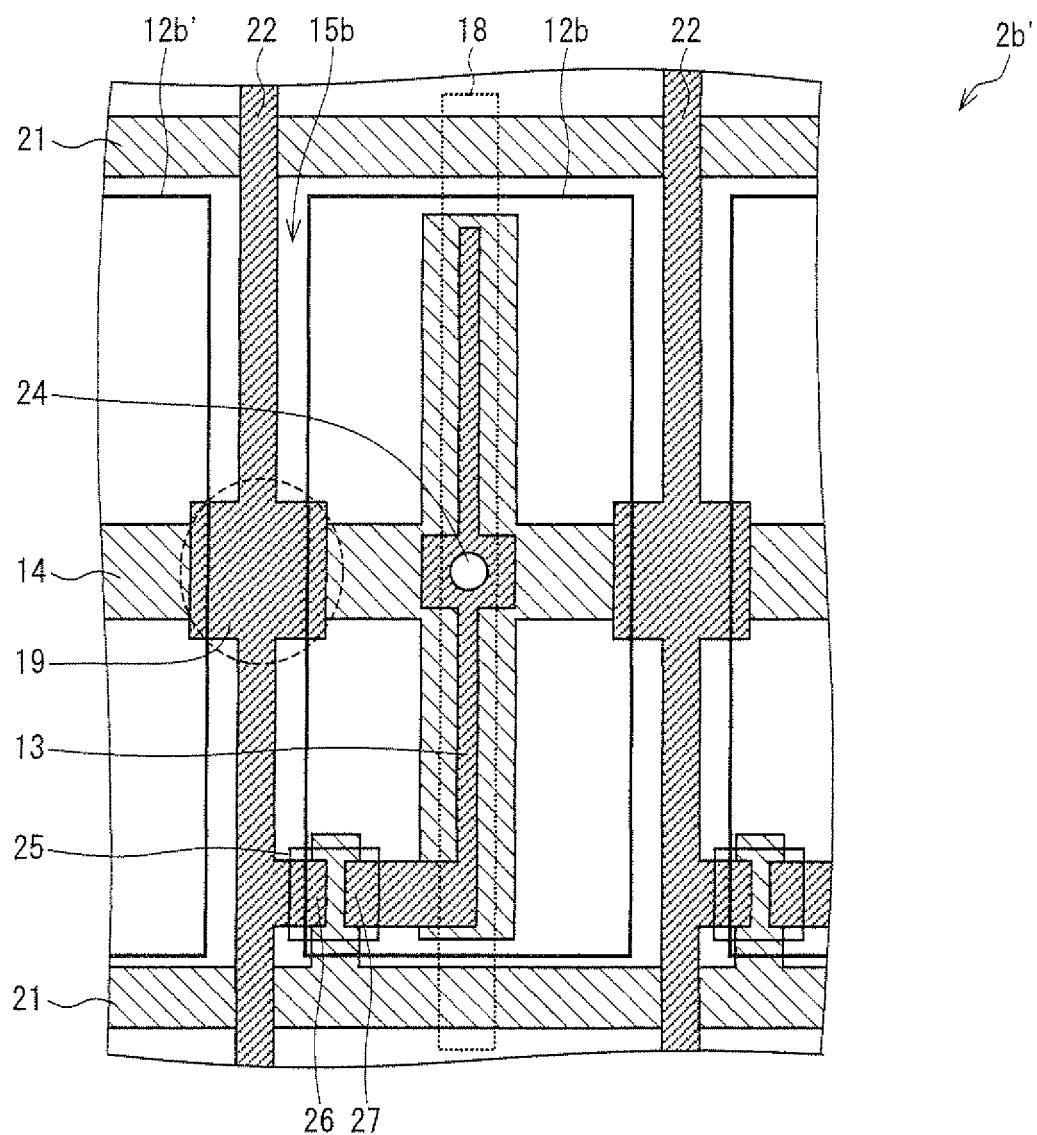

F I G. 1 0
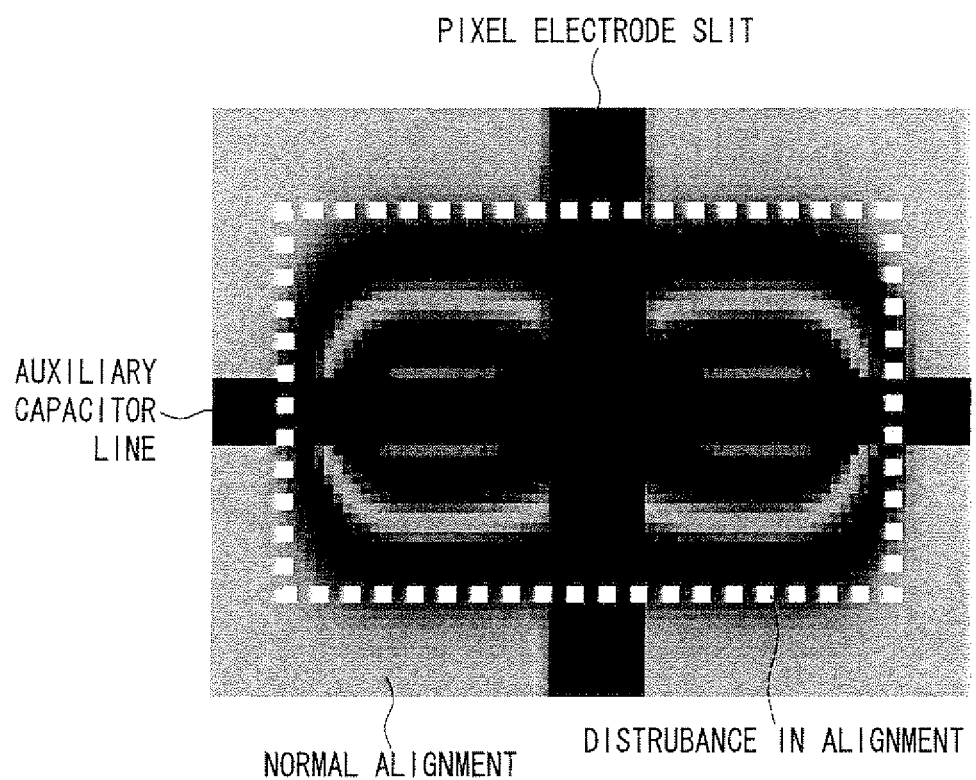

FIG. 11
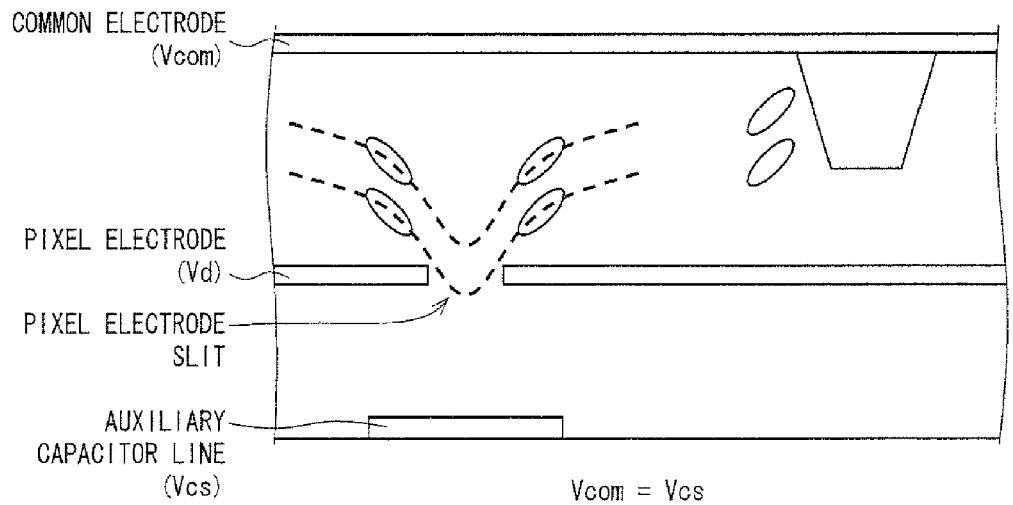
(a) Vcom = Vcs
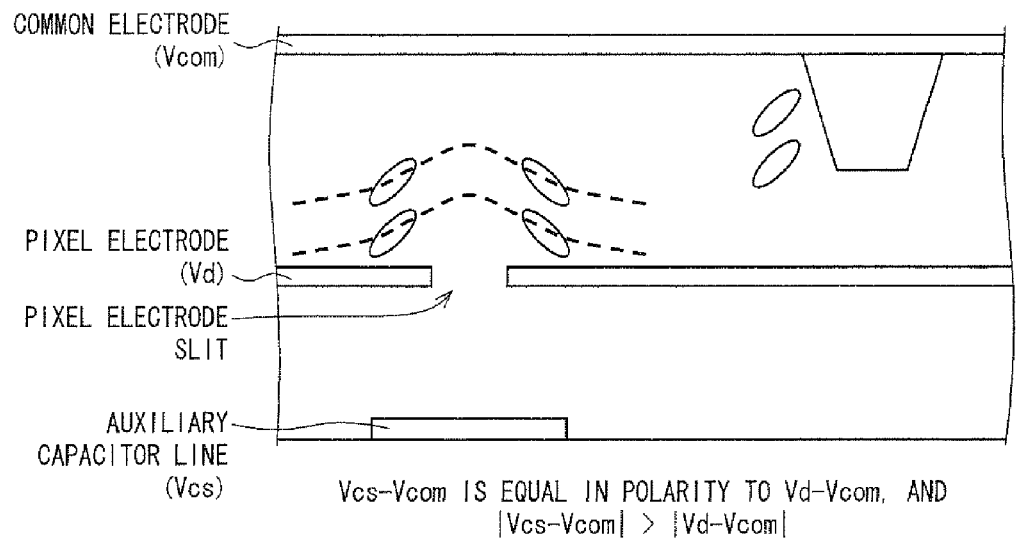
(b) Vcs−Vcom IS EQUAL IN POLARITY TO Vd−Vcom, AND |Vcs−Vcom| > |Vd−Vcom|

ACTIVE MATRIX SUBSTRATE, LIQUID CRYSTAL DISPLAY PANEL, LIQUID CRYSTAL DISPLAY DEVICE, METHOD FOR MANUFACTURING ACTIVE MATRIX SUBSTRATE, METHOD FOR MANUFACTURING LIQUID CRYSTAL DISPLAY PANEL, AND METHOD FOR DRIVING LIQUID CRYSTAL DISPLAY PANEL

This application is the U.S. national phase of International Application No. PCT/JP2009/064029, filed 7 Aug. 2009, which designated the U.S. and claims priority to Japan Application No. 2008-295725, filed 19 Nov. 2008, the entire contents of each of which are hereby incorporated by reference.

TECHNICAL FIELD

The present invention relates to active matrix substrates, liquid crystal display panels, liquid crystal display devices, methods for manufacturing active matrix substrates, and methods for manufacturing liquid crystal display panels, in order to display an image by controlling the alignment of liquid crystal molecules and, in particular, to: an active matrix substrate, a liquid crystal display panel, and a liquid crystal display device, each of which is manufactured by a method including a PSA (polymer sustained alignment) treatment; a method for manufacturing an active matrix substrate and a method for manufacturing a liquid crystal display panel, each of which includes a PSA treatment; and a method for driving a liquid crystal display panel.

BACKGROUND ART

In recent years, along with the popularization of information equipment, there has been a growing demand for higher levels of performance of display panels (liquid crystal display devices). In a liquid crystal display device, the passage and blockage of transmitted light is controlled by changing the direction of alignment of the liquid crystal molecules according to applied voltage. For the liquid crystal display device to have a higher level of performance, the state of alignment of the liquid crystal molecules in the absence of voltage being applied to the liquid crystals is important. Therefore, for a satisfactory state of alignment, it is necessary to control an initial formed angle (pretilt angle) between the liquid crystal layer and the liquid crystal molecules.

A known example of a method for controlling a pretilt angle is a technique disclosed in Patent Literature 1 listed below, i.e., a technique so called PSA. PSA is a technique by which the direction in which the liquid crystals lean is memorized by mixing polymerizable monomers into the liquid crystals and polymerizing the monomers with light, heat, or the like in the presence of voltage being applied to the liquid crystals. For example, first, a liquid crystal material containing monomers is injected into a cell obtained by so joining two substrates each provided with an alignment film to each other that the alignment films face each other. Then, the monomers are polymerized by irradiating them with ultraviolet rays with the liquid crystal molecules aligned along a predetermined direction, for example, by applying an electric field to the cell.

Thus formed on each of the alignment films is a polymer layer having a tilt. As a result, those liquid crystal molecules in contact with the polymer layer can be fixed with a pretilt angle given thereto. According to PSA, even a pixel structure that is weak in alignment controllability for the purpose of a larger aperture ratio or the like becomes faster in response speed and unlikely to suffer from a disturbance in liquid crystal alignment, for example, even when pressed with a finger.

Furthermore, at the step of aligning liquid crystal molecules according to PSA (such a step being hereinafter called "PSA step"), a method for applying voltage is important because when there is a variation in magnitude of voltage that is applied during ultraviolet irradiation, there occurs a difference in pretilt angle that leads to a variation in transmittance characteristic. For this reason, in Patent Literature 2 listed below, for example, there is proposed a method for manufacturing a liquid crystal display device through a PSA step under a scheme to avoid the influence of a defect in wiring by driving the liquid crystals through the use of a capacitor formed by AC application, i.e., under a Cs-COM voltage application scheme.

According to the method for manufacturing a liquid crystal display device described in Patent Literature 2, a first substrate is provided with a common electrode through which voltage is applied to the entire substrate, and a second substrate has gate bus lines and data bus lines disposed thereon in a matrix manner. Provided at an intersection between two bus lines are a thin-film transistor, a pixel electrode connected thereto, and a Cs bus line that forms a capacitor with the pixel electrode. Further provided in a space between the first and second substrates is a liquid crystal layer formed by filling the space with a liquid crystal composition containing a photosensitive material, with a capacitor formed by the common electrode and the pixel electrode with the liquid crystal layer sandwiched therebetween. Moreover, according to the method for manufacturing a liquid crystal display device described in Patent Literature 2, the liquid crystal layer is irradiated with light by applying AC voltage between the common electrode and the pixel electrode.

Thus, during application of voltage to the liquid crystals, the voltage is written by applying it between two common electrodes, instead of being written through a data bus line. This makes it possible to prevent a problem associated with a defective part made by a breakage or short circuit in a bus line during writing through the data bus line, i.e., to prevent such an obstacle that only the defective part shows a different level of brightness due to a pretilt angle formed in the defective part.

CITATION LIST

Patent Literature 1
Japanese Patent Application Publication, Tokukai, No. 2003-149647 (Publication Date: May 21, 2003)
Patent Literature 2
Japanese Patent Application Publication, Tokukai, No. 2003-177408 (Publication Date: Jun. 27, 2003)

SUMMARY OF INVENTION

Technical Problem

However, the configuration of Patent Literature 2 poses such a problem that the PSA step under the Cs-COM voltage application scheme causes a disturbance in alignment in a position where a pixel electrode slit and an auxiliary capacitor line cross each other.

In general, the alignment of liquid crystal molecules is controlled, for example, by providing a pixel electrode with a slit, and the alignment of liquid crystal molecules depends on equipotential surfaces that are formed when voltage is applied to the pixel electrode. That is, the inclination of liquid crystal molecules is controlled by the orientation of an electric field. At this time, in a region of intersection between the slit in the pixel electrode and the auxiliary capacitor line, there is a variation in orientation of the electric field due to the potential of the auxiliary capacitor line.

FIG. 9 shows those lines of electric force (indicated by arrows) and equipotential surfaces (indicated by dotted lines) in proximity to a slit between a pixel electrode provided with the slit and a counter substrate, (a) showing those lines of electric force and equipotential surfaces in a region where the slit does not intersect with an auxiliary capacitor line, (b) showing those lines of electric force and equipotential surfaces in a region of intersection between the slit intersects and an auxiliary capacitor line, with the auxiliary capacitor line being equal in potential to a COM potential, (c) showing those lines of electric force and equipotential surfaces in the region of intersection between the slit and the auxiliary capacitor line, with the auxiliary capacitor line being higher in potential than the COM potential.

See the case of those equipotential surfaces and lines of electric forces shown in (a) and (b) of FIG. 9. At respective ends of two pixel electrodes adjacent to each other with a space therebetween, there are lines of electric force inclined from the respective ends toward the center of the space. In this case, it is possible to align liquid crystal molecules along an appropriate direction as will be mentioned later. On the other hand, see the case of those equipotential surfaces and lines of electric forces shown in (c) of FIG. 9. At the respective ends of the two pixel electrodes, there are lines of electric force inclined from the vicinity of the center of the space to positions above the respective ends of the pixel electrodes in directions opposite to the lines of electric force of (b) of FIG. 9. In this case, it is impossible to align liquid crystal molecules along an appropriate direction as will be mentioned later.

FIG. 10 shows the appearance of a disturbance in alignment due to the PSA step under the Cs-COM voltage application scheme near a position where a pixel electrode slit and an auxiliary capacitor line cross each other. In FIG. 10, the white regions indicate regions of normal alignment, and the black stripe pattern indicates dark lines caused by the disturbance in alignment. Such a disturbance in alignment occurs when, at the PSA step under the Cs-COM voltage application scheme, a potential difference obtained by subtracting the potential of the common electrode (Vcom) from the potential of the auxiliary capacitor line (Vcs) is equal in polarity to a potential difference obtained by subtracting the potential of the common electrode (Vcom) from the potential of the pixel electrode (Vd) and the absolute value of a difference between the potential of the auxiliary capacitor line (Vcs) and the potential of the common electrode (Vcom) is greater than the absolute value of a difference between the potential of the pixel electrode (Vd) and the potential of the common electrode (Vcom) (i.e., when Vcs–Vcom is equal in polarity to Vd–Vcom and |Vcs–Vcom|>|Vd–Vcom|). In this case, the equipotential surfaces are shaped as shown in (c) of FIG. 9 under the influence of the potential of the auxiliary capacitor line below the slit; therefore, it is impossible to give an appropriate pretilt angle to the liquid crystal molecules. Moreover, such equipotential surfaces as those shown in (c) of FIG. 9 pose a further problem when the common electrode of the counter substrate is provided with a liquid crystal alignment control structure.

This problem is discussed in more detail below. FIG. 11 shows the appearance of alignment of liquid crystal molecules in a liquid crystal display device including an auxiliary capacitor line, a pixel electrode having a slit, and a common electrode having a projection, (a) showing the appearance of alignment of liquid crystal molecules during normal driving, (b) showing alignment of liquid crystal molecules as formed by the PSA step under the Cs-COM voltage application scheme. The projection provided on the common electrode is an alignment control structure for controlling the pretilt of liquid crystal molecules, as with the slit formed in the pixel electrode. It should be noted that the alignment control structure provided to the common electrode is not limited to the projection and may be a slit.

In the case of normal driving, as shown in (a) of FIG. 11, such voltage is applied to the common electrode, the pixel electrode, and the auxiliary capacitor line that "Potential of Common Electrode (Vcom)=Potential of Auxiliary Capacitor Line (Vcs)". As a result, those equipotential lines in proximity to the slit provided in the pixel electrode are convex toward the auxiliary capacitor line (which corresponds to (b) of FIG. 9). In this case, those liquid crystals aligned near the projection provided on the common electrode and those liquid crystals aligned near the slit provided in the pixel electrode lean in the same direction, so that there occurs no disturbance in alignment. As a result, there appear no dark lines.

Meanwhile, at the PSA step under the Cs-COM voltage application scheme, as shown in (b) of FIG. 11, such voltage is applied to the common electrode, the pixel electrode, and the auxiliary capacitor line that Vcs–Vcom is equal in polarity to Vd–Vcom and that |Vcs–Vcom|>|Vd–Vcom|. As a result, those equipotential lines in proximity to the slit provided in the pixel electrode are convex toward the common electrode (which corresponds to (c) of FIG. 9) in a direction opposite to the case of normal driving. In this case, those liquid crystals aligned near the projection provided on the common electrode and those liquid crystals aligned near the slit provided in the pixel electrode lean in opposite directions, so that there occurs a disturbance in alignment. As a result, there appear such dark lines as those shown in FIG. 10.

That is, the PSA step under the Cs-COM voltage application scheme cannot form a pretilt angle unidirectionally within a single domain formed by aligning liquid crystal molecules along a predetermined direction within a single pixel.

Therefore, after the conventional PSA step, the pretilt angle is fixed in the state shown in (b) of FIG. 11, and the dark lines of FIG. 10 appear even during normal driving, thus ending up inviting deterioration in display quality.

Further, even during normal driving of a liquid crystal display device manufactured by a manufacturing method not including a PSA step, there occurs a disturbance in alignment of those liquid crystals in proximity to a slit provided in a pixel electrode and intersecting with an auxiliary capacitor line, when such voltage is applied to the auxiliary capacitor line that (Potential of Auxiliary Capacitor Line–Potential of Common Electrode) is equal in polarity to (Potential of Pixel Electrode–Potential of Common Electrode) and that |Potential of Auxiliary Capacitor Line–Potential of Common Electrode|>|Potential of Pixel Electrode–Potential of Common Electrode|. After all, there appear such dark lines as those shown in FIG. 10.

Furthermore, when, in a liquid crystal display device having such a structure that a scanning signal line is disposed below a pixel electrode and a slit provided in the pixel electrode intersects with the scanning signal line, such voltage is applied to the scanning signal line that (Potential of Auxiliary Capacitor Line–Potential of Common Electrode) is equal in polarity to (Potential of Pixel Electrode–Potential of Common Electrode) and that |Potential of Auxiliary Capacitor Line−Potential of Common Electrode|>|Potential of Pixel Electrode−Potential of Common Electrode|, there occurs a disturbance in alignment of those liquid crystals in proximity to the slit provided in the pixel electrode and intersecting with the scanning signal line. After all, there appear such dark lines as those shown in FIG. 10.

The present invention has been made in view of the foregoing problems, and it is an object of the present invention to provide an active matrix substrate, a liquid crystal display panel, a liquid crystal display device, a method for manufacturing an active matrix substrate, a method for manufacturing a liquid crystal display panel, and a method for driving a liquid crystal display panel, each of which can achieve a high-quality display suppressing a disturbance in alignment of liquid crystals.

Solution to Problem

In order to solve the foregoing problems, an active matrix substrate according to the present invention is an active matrix substrate including: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules; a switching element that switches a signal wire as one of the signal wires and a pixel electrode section as one of the pixel electrode sections into a conducting state or a non-conducting state in accordance with a scanning signal supplied from a scanning signal line as one of the scanning signal lines; a metal wire, connected to the switching element, through which when the switching element is in a conducting state, a data signal from the signal wire is supplied to the pixel electrode section; and an auxiliary capacitor line that forms a capacitor with the pixel electrode section, in a region of intersection between the alignment control space section and the auxiliary capacitor line or the scanning signal line, a metal layer being provided between a layer of the pixel section and a layer of the scanning signal line in such a way as to cover at least the auxiliary capacitor line or the scanning signal line.

According to the foregoing configuration, the active matrix substrate includes: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules.

The pixel electrode sections may each be constituted by a single pixel electrode or a plurality of subpixel electrodes. Further, the pixel section corresponds to the group of pixel electrode sections provided at the points of intersection between the scanning signal lines and the signal wires. Moreover, the pixel section has, as an alignment control space section that changes a state of alignment of liquid crystal molecules, an ordinary slit or a fine slit provided in each of the pixel electrodes constituting the pixel electrode sections. Alternatively, the pixel section may have as an electrode sections constituting the pixel section.

Further, according to the foregoing configuration, the active matrix substrate includes: a switching element that switches a signal wire as one of the signal wires and a pixel electrode section as one of the pixel electrode sections into a conducting state or a non-conducting state in accordance with a scanning signal supplied from a scanning signal line as one of the scanning signal lines; a metal wire, connected to the switching element, through which when the switching element is in a conducting state, a data signal from the signal wire is supplied to the pixel electrode section; and an auxiliary capacitor line that forms a capacitor with the pixel electrode section.

The switching element is constituted, for example, by a TFT, and each of the pixel electrode sections has such a switching element provided between the pixel electrode section and the signal wire. The switching element carries out switching in accordance with a signal from the scanning signal line to switch the electrical connection between the pixel electrode section and the signal wire, i.e., to switch the pixel electrode section and the signal wire between a conducting state and a non-conducting state. The switching element is electrically connected to the pixel electrode section through the metal wire and, in a conducting state, a voltage corresponding to a data signal from the signal wire is supplied to the pixel electrode section. The metal wire is constituted, for example, as a drain line extending from the drain electrode of the TFT. Furthermore, the auxiliary capacitor line is provided to form a capacitor with the pixel electrode section.

Moreover, according to the foregoing configuration, in a region of intersection between the alignment control space section and the auxiliary capacitor line or the scanning signal line, a metal layer is provided between a layer of the pixel section and a layer of the auxiliary capacitor line or of the scanning signal line in such a way as to cover at least the auxiliary capacitor line or the scanning signal lines. Examples of the metal layer include the metal wire extending from the drain electrode, the signal wire, an intermediate electrode, or a shield metal formed totally independently. The term "intermediate electrode" here means an electrode, connected to a pixel electrode through a contact hole, which is equal in potential to the pixel electrode.

Conventionally, in the case of manufacture of a liquid crystal display panel having a liquid crystal layer provided between an active matrix substrate and a counter substrate, a PSA step may be carried out to form a pretilt angle of liquid crystal molecules. However, in a liquid crystal display panel including an auxiliary capacitor line, such relationships hold during the PSA step that (Potential of Auxiliary Capacitor Line−Potential of Common Electrode) is equal in polarity to (Potential of Pixel Electrode−Potential of Common Electrode) and that |Potential of Auxiliary Capacitor Line−Potential of Common Electrode|>|Potential of Pixel Electrode−Potential of Common Electrode|; therefore, due to the influence of those equipotential surfaces formed in an area of the liquid crystal layer around the alignment control space section, there occurs a defect in alignment of liquid crystal molecules, and the defect in alignment causes deterioration in display quality.

Further, conventionally, when, during normal driving of a liquid crystal display device having an intersection between an alignment control space section and an auxiliary capacitor line (or a scanning signal line), as well as a liquid crystal display device subjected to the PSA step, such voltage is applied to the auxiliary capacitor line (or the scanning signal line) that (Potential of Auxiliary Capacitor Line (or Scanning Signal Line)−Potential of Common Electrode) is equal in polarity to (Potential of Pixel Electrode−Potential of Common Electrode) and that |Potential of Auxiliary Capacitor Line (or Scanning Signal Line)−Potential of Common Electrode|>|Potential of Pixel Electrode−Potential of Common Electrode1, there occurs a disturbance in alignment of an area of the liquid crystal layer around the alignment control space section intersecting with the auxiliary capacitor line (or the scanning signal line) and, after all, the disturbance in alignment causes deterioration in display quality.

On the other hand, the active matrix substrate of the present invention thus configured allows at least the auxiliary capacitor line or the scanning signal line to be covered by the metal layer so that there is no direct overlap between (i) the open region of the alignment control space section, i.e., of a slit or of a space between pixel electrodes and (ii) the auxiliary capacitor line or the scanning signal line.

Such a configuration allows the potential of the metal layer to be set during the PSA step or during normal driving, for example, to form any one of the following states of potential: a first state of potential where a potential difference obtained by subtracting the potential of the common electrode from the potential of the metal layer is opposite in polarity to a potential difference obtained by subtracting the potential of the common electrode from the potential of the pixel electrode; a second state of potential where the potential of the metal layer is equal to the potential of the common electrode; and a third state of potential where the potential difference obtained by subtracting the potential of the common electrode from the potential of the metal layer is equal in polarity to the potential difference obtained by subtracting the potential of the common electrode from the potential of the pixel electrode section and where the absolute value of a difference between the potential of the pixel electrode section and the potential of the common electrode is greater than or equal to the absolute value of a difference between the potential of the metal layer and the potential of the common electrode.

Thus, in the region of intersection between the alignment control space section and the auxiliary capacitor line (or the scanning signal line), the metal layer whose potential has been set to form the first, second, or third state of potential is placed between the layer of the auxiliary capacitor line (or of the scanning signal line) and the layer of the pixel electrode; therefore, the influence of the potential of the auxiliary capacitor line (or of the scanning signal line) during the PSA step or during normal driving can be blocked.

Therefore, the active matrix substrate according the present invention makes it possible, during manufacture of a liquid crystal display panel, to keep the alignment of liquid crystal molecules good and align the liquid crystal molecules appropriately, with no influence on the alignment of the liquid crystal molecules by those equipotential surfaces formed in an area of the liquid crystal layer around the alignment control space section intersecting with the auxiliary capacitor line (or the scanning signal line), thus bringing about an effect of achieving an improvement in display quality of the liquid crystal display panel.

Further, a method according to the present invention for manufacturing an active matrix substrate is a method for manufacturing an active matrix substrate including (1) a plurality of scanning signal lines, (ii) a plurality of signal wires disposed in such a way as to intersect with the scanning signal lines, a pixel section constituted by pixel electrode sections each provided in correspondence with a combination of each of the scanning signal lines and each of the signal wires, the pixel section having an alignment control space section that controls a state of alignment of liquid crystal molecules, (iv) a switching element that switches a signal wire as one of the signal wires and a pixel electrode section into a conducting state or a non-conducting state in accordance with a scanning signal supplied from a scanning signal line as one of the scanning signal lines, (v) a metal wire, connected to the switching element, through which when the switching element is in a conducting state, a data signal from the signal wire is supplied to the pixel electrode section, and (vi) an auxiliary capacitor line that forms a capacitor with the pixel electrode section, the method including the step of, in a region of intersection between the alignment control space section and the auxiliary capacitor line or the scanning signal line, forming a metal layer in such a way that the metal layer covers at least the auxiliary capacitor line or the scanning signal line.

The foregoing configuration brings about the same effects as an active matrix substrate according to the present invention.

In order to solve the foregoing problems, an active matrix substrate according to the present invention is an active matrix substrate including: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules; a switching element that switches a signal wire as one of the signal wires and a pixel electrode section as one of the pixel electrode sections into a conducting state or a non-conducting state in accordance with a scanning signal supplied from a scanning signal line as one of the scanning signal lines; and a metal wire, connected to the switching element, through which when the switching element is in a conducting state, a data signal from the signal wire is supplied to the pixel electrode section, in a region of intersection between the alignment control space section and the scanning signal line, a metal layer being provided between a layer of the pixel section and a layer of the scanning signal line in such a way as to cover at least the scanning signal line.

According to the foregoing configuration, the active matrix substrate includes: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules.

The pixel electrode sections may each be constituted by a single pixel electrode or a plurality of subpixel electrodes. Further, the pixel section corresponds to the group of pixel electrode sections provided at the points of intersection between the scanning signal lines and the signal wires. Moreover, the pixel section has, as an alignment control space section that changes a state of alignment of liquid crystal molecules, an ordinary slit or a fine slit provided in each of the pixel electrode sections constituting the pixel section. Alternatively, the pixel section may have as an alignment control space section a space between pixel electrode sections constituting the pixel section.

Further, according to the foregoing configuration, the active matrix substrate includes: a switching element that switches a signal wire as one of the signal wires and a pixel electrode section as one of the pixel electrode sections into a conducting state or a non-conducting state in accordance with a scanning signal supplied from a scanning signal line as one of the scanning signal lines; and a metal wire, connected to the switching element, through which when the switching element is in a conducting state, a data signal from the signal wire is supplied to the pixel electrode section.

The switching element is constituted, for example, by a TFT, and each of the pixel electrode sections has such a switching element provided between the pixel electrode section and the signal wire. The switching element carries out switching in accordance with a signal from the scanning signal line to switch the electrical connection between the pixel electrode section and the signal wire, i.e., to switch the pixel electrode section and the signal wire between a conducting state and a non-conducting state. The switching element is electrically connected to the pixel electrode section through the metal wire and, in a conducting state, a voltage corresponding to a data signal from the signal wire is supplied to the pixel electrode section. The metal wire is constituted, for example, as a drain line extending from the drain electrode of the TFT.

Moreover, according to the foregoing configuration, in a region of intersection between the alignment control space section and the scanning signal line, a metal layer is provided between a layer of the pixel section and a layer of the scanning signal line in such a way as to cover at least the scanning signal line. Examples of the metal layer include the metal wire extending from the drain electrode, the signal wire, an intermediate electrode, or a shield metal formed totally independently.

Conventionally, when, during normal driving or manufacturing process of a liquid crystal display device having an intersection between an alignment control space section and a scanning signal line, such voltage is applied to the scanning signal line that (Potential of Scanning Signal Line−Potential of Common Electrode) is equal in polarity to (Potential of Pixel Electrode−Potential of Common Electrode) and that |Potential of Scanning Signal Line−Potential of Common Electrode|>|Potential of Pixel Electrode−Potential of Common Electrode|, there occurs a disturbance in alignment of an area of the liquid crystal layer around the alignment control space section intersecting with the scanning signal line, and the disturbance in alignment causes deterioration in display quality.

On the other hand, the active matrix substrate of the present invention thus configured allows at least the scanning signal line to be covered by the metal layer so that there is no direct overlap between (i) the open region of the alignment control space section, i.e., of a slit or of a space between pixel electrodes and (ii) the scanning signal line. This metal layer is a metal layer whose potential can be set, for example, to form a first state of potential where a potential difference obtained by subtracting the potential of the common electrode from the potential of the metal layer is opposite in polarity to a potential difference obtained by subtracting the potential of the common electrode from the potential of the pixel electrode; a second state of potential where the potential of the metal layer is equal to the potential of the common electrode; or a third state of potential where the potential difference obtained by subtracting the potential of the common electrode from the potential of the metal layer is equal in polarity to the potential difference obtained by subtracting the potential of the common electrode from the potential of the pixel electrode section and where the absolute value of a difference between the potential of the pixel electrode section and the potential of the common electrode is greater than or equal to the absolute value of a difference between the potential of the metal layer and the potential of the common electrode.

Thus, in the region of intersection between the alignment control space section and the scanning signal line, the metal layer whose potential has been set to form the first, second, or third state of potential is placed between the layer of the scanning signal line and the layer of the pixel electrode; therefore, the influence of the potential of the scanning signal line can be blocked.

Therefore, the active matrix substrate according the present invention makes it possible, during manufacture of a liquid crystal display panel, to keep the alignment of liquid crystal molecules good and align the liquid crystal molecules appropriately, with no influence on the alignment of the liquid crystal molecules by those equipotential surfaces formed in an area of the liquid crystal layer around the alignment control space section intersecting with the scanning signal line, thus bringing about an effect of achieving an improvement in display quality of the liquid crystal display panel.

Further, a method according to the present invention for manufacturing an active matrix substrate is a method for manufacturing an active matrix substrate including (i) a plurality of scanning signal lines, (ii) a plurality of signal wires disposed in such a way as to intersect with the scanning signal lines, (iii) a pixel section constituted by pixel electrode sections each provided in correspondence with a combination of each of the scanning signal lines and each of the signal wires, the pixel section having an alignment control space section that controls a state of alignment of liquid crystal molecules, (iv) a switching element that switches a signal wire as one of the signal wires and a pixel electrode section as one of the pixel electrode sections into a conducting state or a non-conducting state in accordance with a scanning signal supplied from a scanning signal line as one of the scanning signal lines, and (v) a metal wire, connected to the switching element, through which when the switching element is in a conducting state, a data signal from the signal wire is supplied to the pixel electrode section, the method including the step of, in a region of intersection between the alignment control space section and the scanning signal line, forming a metal layer between a layer of the pixel section and a layer of the scanning signal line in such a way that the metal layer covers at least the scanning signal line.

The foregoing configuration brings about the same effects as an active matrix substrate according to the present invention.

Further, the active matrix substrate according to the present invention is preferably configured such that the metal layer is constituted to include at least either the metal wire or the signal wire.

The foregoing configuration makes it possible to concurrently form the metal layer in the manufacturing step of forming the metal wire or the signal wire.

This makes it possible to form the metal layer without an increase in the number of manufacturing steps, thus bringing down manufacturing costs.

Further, the active matrix substrate according to the present invention is preferably configured such that the alignment control space section is a long narrow hole formed individually in the pixel electrode section.

Further, the active matrix substrate according to the present invention is preferably configured such that the alignment control space section is a space formed between one and another of the plurality of pixel electrode sections constituting the pixel section.

Further, the active matrix substrate according to the present invention is preferably configured such that the alignment control space section is a long narrow hole formed by making a cut in the pixel electrode section.

Further, the active matrix substrate according to the present invention is preferably configured such that the pixel electrode section is a multi-pixel electrode including a plurality of subpixel electrodes and is driven by a pixel division method.

According to the foregoing configuration, the pixel electrode section is a multi-pixel electrode composed of a plurality of subpixel electrodes and is driven by a pixel division method.

This makes it possible to express a halftone by composing each pixel of a high-luminance subpixel and a low-luminance subpixel, thus improving the dependence of gamma characteristics on viewing angles (e.g., excess brightness). Moreover, the provision of the active matrix substrate makes it possible to prevent a defect in alignment in the region of intersection between the alignment control space section and the auxiliary capacitor line during the PSA step and actual driving, so that there is no deterioration in display quality.

Further, the active matrix substrate according to the present invention is preferably configured such that in the region of intersection between the alignment control space section and the auxiliary capacitor line, a drain line serving as the metal wire and extending from the switching element formed in a corner portion of the pixel electrode section to the auxiliary capacitor line disposed in such a way as to pass transversely across the pixel electrode section is provided with a covering section that covers at least the auxiliary capacitor line.

Further, the active matrix substrate according to the present invention is preferably configured such that: the scanning signal line is disposed in such a way as to pass transversely across the pixel electrode section; the auxiliary capacitor line is disposed in such a way as to pass transversely across the pixel electrode section substantially in parallel with the scanning signal line; a drain line serving as the metal wire extends from the switching element formed in the pixel electrode section to at least either the region of intersection between the alignment control space section and the auxiliary capacitor line disposed in such a way as to pass transversely across the pixel electrode section or the region of intersection between the alignment control space section and the scanning signal line; and a covering section that covers at least the auxiliary capacitor line and the scanning signal line in the respective regions is provided as part of the drain line.

Further, the active matrix substrate according to the present invention is preferably configured such that: the scanning signal line is disposed in such a way as to pass transversely along an edge of the pixel electrode section; the auxiliary capacitor line is disposed in such a way as to pass transversely across a center of the pixel electrode section substantially in parallel with the scanning signal line; and a drain line serving as the metal wire and extending from the switching element formed in a corner portion of the pixel electrode section to at least either the region of intersection between the alignment control space section and the auxiliary capacitor line disposed in such a way as to pass transversely across the pixel electrode section or the region of intersection between the alignment control space section and the scanning signal line is provided with a covering section that covers at least the auxiliary capacitor line and the scanning signal line in the respective regions.

Further, the active matrix substrate according to the present invention is preferably configured such that: the scanning signal line is disposed in such a way as to pass transversely across a center of the pixel electrode section; the auxiliary capacitor line is disposed in such a way as to pass transversely along an edge of the pixel electrode section substantially in parallel with the scanning signal line; and a drain line serving as the metal wire and extending from the switching element formed in a side edge portion of the pixel electrode section to at least either the region of intersection between the alignment control space section and the auxiliary capacitor line disposed in such a way as to pass transversely across the pixel electrode section or the region of intersection between the alignment control space section and the scanning signal line is provided with a covering section that covers at least the auxiliary capacitor line and the scanning signal line in the respective regions.

Further, the active matrix substrate according to the present invention is preferably configured such that the pixel electrode section has its longer sides extending substantially in parallel with the scanning signal line.

Further, the active matrix substrate according to the present invention is preferably configured such that: the auxiliary capacitor line is provided in such a way as to overlap a site where another alignment control space section adjoining the alignment control space section within each of the pixel electrode sections are close to the alignment control space section at a sharp angle; and in the region of intersection between the auxiliary capacitor line and those of the other alignment control space section and the alignment control space section, a drain line serving as the metal wire and extending from the switching element formed in a corner portion of the pixel electrode section to the auxiliary capacitor line is provided with a covering section that covers at least the auxiliary capacitor line.

Further, the active matrix substrate according to the present invention is preferably configured such that: the auxiliary capacitor line is provided in such a way as to pass transversely across the alignment control space section formed as a space between the plurality of pixel electrode sections; and in the region of intersection between the alignment control space section and the auxiliary capacitor line, a drain line serving as the metal wire and extending from the switching element formed in a corner portion of the pixel electrode section to the auxiliary capacitor line is provided with a covering section that covers at least the auxiliary capacitor line.

Further, the active matrix substrate according to the present invention is preferably configured such that: the auxiliary capacitor line is provided in such a way as to pass transversely across the alignment control space section formed as a space between the plurality of pixel electrode sections; and in the region of intersection between the alignment control space section and the auxiliary capacitor line, a data signal line serving as the signal line and extending from the switching element formed in a corner portion of the pixel electrode section in such a way as to intersect with the auxiliary capacitor line is provided with a covering section that covers at least the auxiliary capacitor line.

Further, the active matrix substrate according to the present invention is preferably configured such that in the region of intersection between the alignment control space section and the scanning signal line, a drain line serving as the metal wire and extending from the switching element formed in the pixel electrode section to the scanning signal line disposed in such a way as to pass transversely across the pixel electrode section is provided with a covering section that covers at least the scanning signal line.

A liquid crystal display panel according to the present invention includes: such an active matrix substrate as described above; a counter substrate provided with a common electrode; and a liquid crystal layer sandwiched between the active matrix substrate and the counter substrate.

According to the foregoing configuration, the active matrix substrate can block the influence of the potential of the scanning signal line or of the auxiliary capacitor line in the region of intersection between the alignment control section and the scanning signal line or the auxiliary capacitor line during normal driving or at the PSA step in the process of manufacture. This makes it possible to keep the alignment of liquid crystal molecules good and align the liquid crystal molecules appropriately, thus making it possible to achieve a liquid crystal display panel of high display quality.

The liquid crystal display panel according to the present invention is preferably configured such that the counter substrate includes an alignment control section that controls a state of alignment of liquid crystal molecules.

In the liquid crystal display panel thus configured, the counter substrate includes an alignment control section. The alignment control section may be, but is not particularly limited to, a rib or a slit.

This allows the alignment of liquid crystal molecules within the liquid crystal layer to be controlled, i.e., the liquid crystal molecules to be given a desired alignment. Moreover, the provision of the active matrix substrate makes it possible to prevent a defect in alignment in the region of intersection between the alignment control space section and the scanning signal line or the auxiliary capacitor line during normal driving, at the PSA step in the process of manufacture, etc., so that there is no deterioration in display quality.

A liquid crystal display device according to the present invention includes: such a liquid crystal display panel as described above; and a driving circuit that drives the liquid crystal display panel.

According to the foregoing configuration, the active matrix substrate can block the influence of the potential of the scanning signal line or of the auxiliary capacitor line in the region of intersection between the alignment control section and the scanning signal line or the auxiliary capacitor line during normal driving or at the PSA step in the process of manufacture. This makes it possible to keep the alignment of liquid crystal molecules good and give an appropriate pretilt angle to the liquid crystal molecules, thus making it possible to achieve a liquid crystal display device of high display quality.

A method according to the present invention for manufacturing a liquid crystal display panel is a method for manufacturing such a liquid crystal display panel as described above, the method preferably including a polymer alignment supporting step of giving a pretilt angle to liquid crystal molecules of the liquid crystal layer by polymerizing monomers mixed in advance into the liquid crystal layer, with voltage being applied to the liquid crystal layer in any one of the following states of potential: a first state of potential where a potential difference obtained by subtracting a potential of the common electrode from a potential of the metal layer is opposite in polarity to a potential difference obtained by subtracting the potential of the common electrode from a potential of the pixel electrode section; a second state of potential where the potential of the metal layer is equal to the potential of the common electrode; and a third state of potential where the potential difference obtained by subtracting the potential of the common electrode from the potential of the metal layer is equal in polarity to the potential difference obtained by subtracting the potential of the common electrode from the potential of the pixel electrode section and where an absolute value of a difference between the potential of the pixel electrode section and the potential of the common electrode is greater than or equal to an absolute value of a difference between the potential of the metal layer and the potential of the common electrode.

The foregoing configuration allows the scanning signal line or the auxiliary capacitor line to be covered by the metal layer so that there is no direct overlap between (i) the open region of the alignment control space section, i.e., of a slit or of a space between pixel electrodes and (ii) the scanning signal line or the auxiliary capacitor line.

Moreover, at the polymer alignment supporting step, i.e., at the PSA step, the potential of the metal layer can be set to form the first state of potential where the potential difference obtained by subtracting the potential of the common electrode from the potential of the metal layer is opposite in polarity to the potential difference obtained by subtracting the potential of the common electrode from the potential of the pixel electrode section, the second state of potential where the potential of the metal layer is equal to the potential of the common electrode, or the third state of potential where the potential difference obtained by subtracting the potential of the common electrode from the potential of the metal layer is equal in polarity to the potential difference obtained by subtracting the potential of the common electrode from the potential of the pixel electrode section and where the absolute value of the difference between the potential of the pixel electrode section and the potential of the common electrode is greater than or equal to the absolute value of the difference between the potential of the metal layer and the potential of the common electrode.

Thus, in the region of intersection between the alignment control space section and the scanning signal line or the auxiliary capacitor line, the metal layer whose potential has been set to form the first, second, or third state of potential is placed between the layer of the scanning signal line or of the auxiliary capacitor line and the layer of the pixel electrode; therefore, the influence of the potential of the scanning signal line or of the auxiliary capacitor line can be blocked.

Therefore, the method according to the present invention for manufacturing a liquid crystal display panel makes it possible to keep the alignment of liquid crystal molecules good and align the liquid crystal molecules appropriately, with no influence on the alignment of the liquid crystal molecules by those equipotential surfaces formed in an area of the liquid crystal layer around the alignment control space section intersecting with the scanning signal line or the auxiliary capacitor line, thus bringing about an effect of achieving an improvement in display quality of the liquid crystal display panel.

A method according to the present invention for driving a liquid crystal display panel is a method for driving such a liquid crystal display panel as described above, the method preferably including applying voltage to the liquid crystal layer in any one of the following states of potential: a first state of potential where a potential difference obtained by subtracting a potential of the common electrode from a potential of the metal layer is opposite in polarity to each other a potential difference obtained by subtracting the potential of the common electrode from a potential of the pixel electrode section; a second state of potential where the potential of the metal layer is equal to the potential of the common electrode; and a third state of potential where the potential difference obtained by subtracting the potential of the common electrode from the potential of the metal layer is equal in polarity to the potential difference obtained by subtracting the potential of the common electrode from the potential of the pixel electrode section and where an absolute value of a difference between the potential of the pixel electrode section and the potential of the common electrode is greater than or equal to an absolute value of a difference between the potential of the metal layer and the potential of the common electrode.

The foregoing configuration allows the auxiliary capacitor line or the scanning signal line to be covered by the metal layer so that there is no direct overlap between (i) the open region of the alignment control space section, i.e., of a slit or of a space between pixel electrodes and (ii) the auxiliary capacitor line or the scanning signal line.

Moreover, during actual driving of the liquid crystal display panel, the potential of the metal layer can be set to form the first state of potential where the potential difference obtained by subtracting the potential of the common electrode from the potential of the metal layer is opposite in polarity to the potential difference obtained, by subtracting the potential of the common electrode from the potential of the pixel electrode section, the second state of potential where the potential of the metal layer is equal to the potential of the common electrode, or the third state of potential where the potential difference obtained by subtracting the potential of the common electrode from the potential of the metal layer is equal in polarity to the potential difference obtained by subtracting the potential of the common electrode from the potential of the pixel electrode section and where the absolute value of the difference between the potential of the pixel electrode section and the potential of the common electrode is greater than or equal to the absolute value of the difference between the potential of the metal layer and the potential of the common electrode.

Thus, in the region of intersection between the alignment control space section and the scanning signal line or the auxiliary capacitor line, the metal layer whose potential has been set to form the first, second, or third state of potential is placed between the layer of the scanning signal line or of the auxiliary capacitor line and the layer of the pixel electrode; therefore, the influence of the potential of the scanning signal line or of the auxiliary capacitor line can be blocked.

Therefore, the method according to the present invention for driving a liquid crystal display panel makes it possible to keep the alignment of liquid crystal molecules good and align the liquid crystal molecules appropriately, with no influence on the alignment of the liquid crystal molecules by those equipotential surfaces formed in an area of the liquid crystal layer around the alignment control space section intersecting with the scanning signal line or the auxiliary capacitor line, thus bringing about an effect of achieving an improvement in display quality of the liquid crystal display panel.

Advantageous Effects of Invention

In order to solve the foregoing problems, an active matrix substrate according to the present invention is an active matrix substrate including: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules; a switching element that switches a signal wire as one of the signal wires and a pixel electrode section as one of the pixel electrode sections into a conducting state or a non-conducting state in accordance with a scanning signal supplied from a scanning signal line as one of the scanning signal lines; a metal wire, connected to the switching element, through which when the switching element is in a conducting state, a data signal from the signal wire is supplied to the pixel electrode section; and an auxiliary capacitor line that forms a capacitor with the pixel electrode section, in a region of intersection between the alignment control space section and the auxiliary capacitor line or the scanning signal line, a metal layer being provided between a layer of the pixel section and a layer of the scanning signal line in such a way as to cover at least the auxiliary capacitor line or the scanning signal line.

In order to solve the foregoing problems, an active matrix substrate according to the present invention is an active matrix substrate including: a plurality of scanning signal lines; a plurality of signal wires disposed in such a way as to intersect with the scanning signal lines; a pixel section constituted by pixel electrode sections each provided in correspondence with a combination of each of the scanning signal lines and each of the signal wires, the pixel section having an alignment control space section that controls a state of alignment of liquid crystal molecules; a switching element that switches a signal wire as one of the signal wires and a pixel electrode section as one of the pixel electrode sections into a conducting state or a non-conducting state in accordance with a scanning signal supplied from a scanning signal line as one of the scanning signal lines; and a metal wire, connected to the switching element, through which when the switching element is in a conducting state, a data signal from the signal wire is supplied to the pixel electrode section, in a region of intersection between the alignment control space section and the scanning signal line, a metal layer being provided between a layer of the pixel section and a layer of the scanning signal line in such a way as to cover at least the scanning signal line.

Therefore, in the region of intersection between the alignment control space section and the scanning signal line or the auxiliary capacitor line, the metal layer whose potential has been set to form (i) a first state of potential where a potential difference obtained by subtracting the potential of the common electrode from the potential of the metal layer is opposite in polarity to a potential difference obtained by subtracting the potential of the common electrode from the potential of the pixel electrode section, (ii) a second state of potential where the potential of the metal layer is equal to the potential of the common electrode, and (iii) a third state of potential where the potential difference obtained by subtracting the potential of the common electrode from the potential of the metal layer is equal in polarity to the potential difference obtained by subtracting the potential of the common electrode from the potential of the pixel electrode section and where the absolute value of a difference between the potential of the pixel electrode section and the potential of the common electrode is greater than or equal to the absolute value of a difference between the potential of the metal layer and the potential of the common electrode, is placed between the layer of the scanning signal line or of the auxiliary capacitor line and the layer of the pixel electrode; therefore, the influence of the potential of the scanning signal line or of the auxiliary capacitor line during normal driving or at a PSA step in the process of manufacture can be blocked.

This makes it possible to keep the alignment of liquid crystal molecules good and align the liquid crystal molecules appropriately, with no influence on the alignment of the liquid crystal molecules by those equipotential surfaces formed in an area of the liquid crystal layer around the alignment control space section intersecting with the scanning signal line or the auxiliary capacitor line, thus bringing about an effect of achieving an improvement in display quality of the liquid crystal display panel.

BRIEF DESCRIPTION OF DRAWINGS

FIG. 1 is a cross-sectional view schematically showing the configuration of a main part of a liquid crystal display panel according to the present embodiment.

FIG. 2 includes block diagrams (a) and (b) each schematically showing the configuration of a liquid crystal display device according to the present embodiment, (a) showing a liquid crystal display device that is driven by using auxiliary capacitors, (b) showing a liquid crystal display device that is driven without using auxiliary capacitors.

FIG. 3 includes plan views (a) to (e) schematically showing example configurations of liquid crystal display panels having pixel electrodes provided with ordinary slits according to the present embodiment, respectively.

FIG. 4a

FIG. 4a is a plan view schematically showing the configuration of a liquid crystal display panel provided with an inter-pixel slit according to the present embodiment.

FIG. 4b is a cross-sectional view schematically showing the configuration of the liquid crystal display panel shown in FIG. 4a.

FIG. 5

FIG. 5 is a plan view schematically showing the configuration of another liquid crystal display panel provided with an inter-pixel slit according to the present embodiment.

FIG. 6 is a plan view schematically showing the configuration of a liquid crystal display panel having a pixel electrode provided with fine slits according to the present embodiment.

FIG. 7 includes (a) a plan view showing the configuration of a liquid crystal display panel having a pixel structure of horizontally long pixel elements according to the present embodiment, with a scanning signal line formed in the center of each pixel electrode, and (b) a plan view showing the configuration of a liquid crystal display panel having a pixel structure of horizontally long pixel elements according to the present embodiment, with each pixel electrode overlapping a scanning signal line in the vicinity of a longer side.

FIG. 8 shows the configuration of a liquid crystal display panel having a multi-pixel structure according to the present embodiment.

FIG. 9 shows those lines of electric force and equipotential surfaces in proximity to a slit between a pixel electrode provided with the slit and a counter substrate, (a) showing those lines of electric force and equipotential surfaces in a region where the slit does not intersect with an auxiliary capacitor line, (b) showing those lines of electric force and equipotential surfaces in a region of intersection between the slit and an auxiliary capacitor line, with the auxiliary capacitor line being equal in potential to a COM potential, (c) showing those lines of electric force and equipotential surfaces in the region of intersection between the slit and the auxiliary capacitor line, with the auxiliary capacitor line being higher in potential than the COM potential.

FIG. 10

FIG. 10 shows the appearance of a disturbance in alignment due to a PSA step under a Cs-COM voltage application scheme.

FIG. 11

FIG. 11 shows the appearance of alignment of liquid crystal molecules in a liquid crystal display device including an auxiliary capacitor line, a pixel electrode having a slit, and a common electrode having a projection, (a) showing the appearance of alignment of liquid crystal molecules during normal driving, (b) showing alignment of liquid crystal molecules as formed by the PSA step under the Cs-COM voltage application scheme.

FIG. 12 is a block diagram schematically showing the configuration of another liquid crystal display device according to the present embodiment.

DESCRIPTION OF EMBODIMENTS (Overview of a Liquid Crystal Display Device 1)

Figure 1:
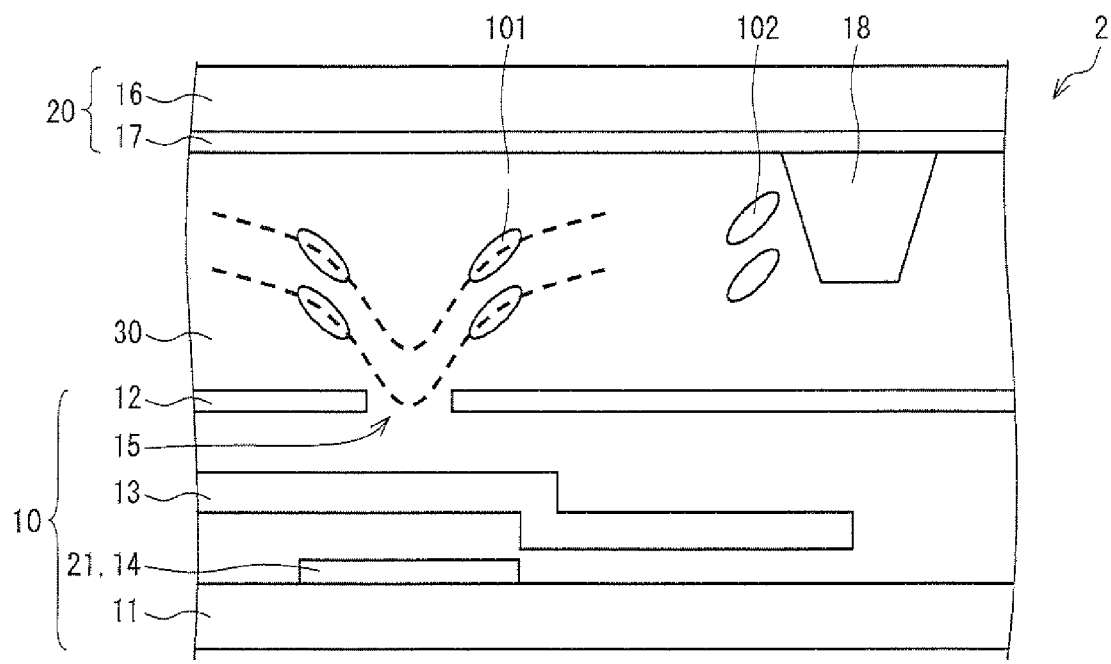
FIG. 1
Figure 2:
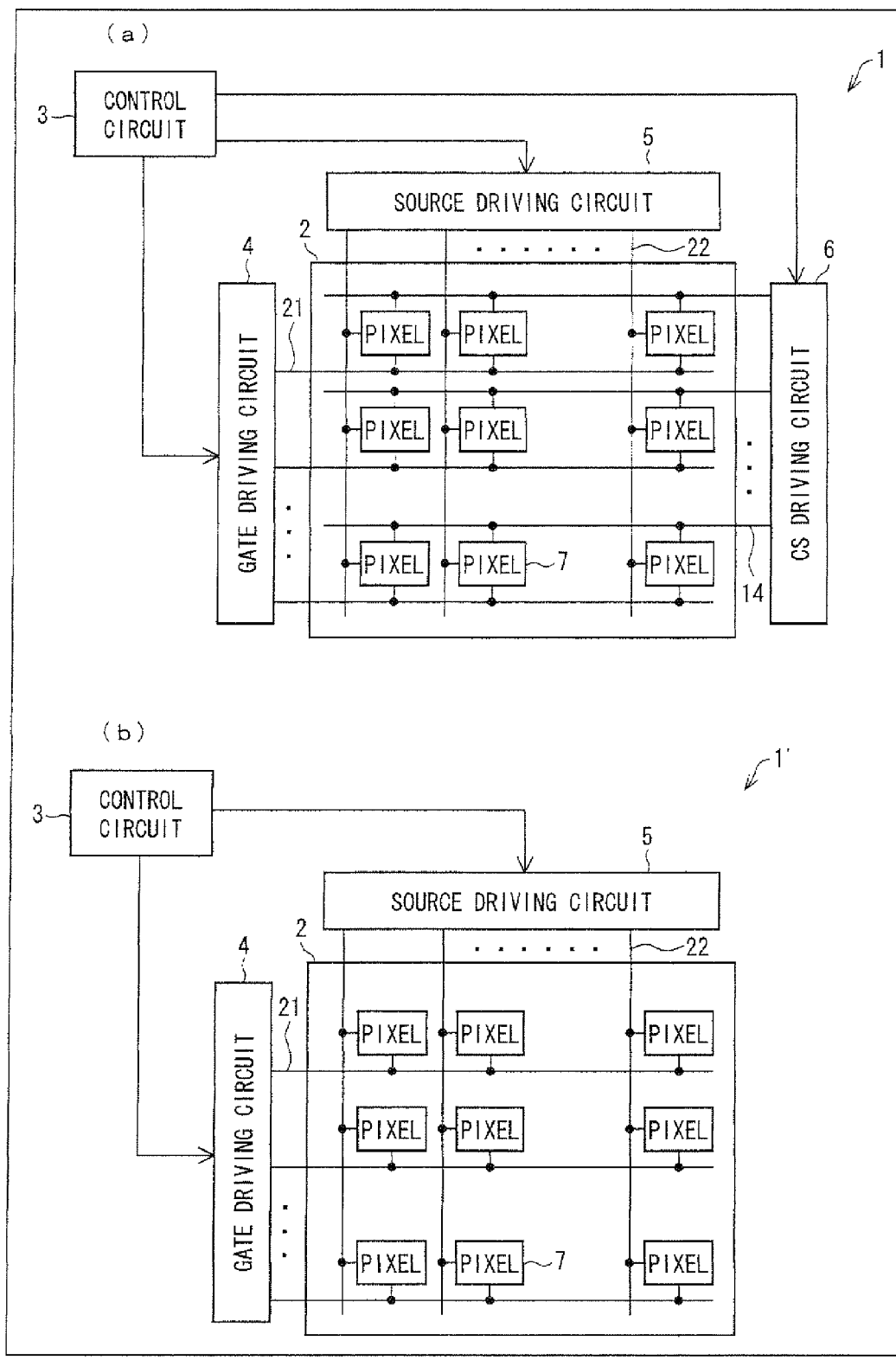
FIG. 2

An embodiment of the present invention is described below with reference to FIGS. 1 through 8. First, an overview of a liquid crystal display device 1 according to the present embodiment is given. FIG. 1 is a cross-sectional view schematically showing the configuration of a main part of a liquid crystal display panel 2 according to the present embodiment. FIG. 2 includes block diagrams (a) and (b) each schematically showing the configuration of a liquid crystal display device according to the present embodiment, (a) showing a liquid crystal display device 1 that is driven by using auxiliary capacitors, (b) showing a liquid crystal display device 1' that is driven without using auxiliary capacitors.

As shown in (a) of FIG. 2, the liquid crystal display device 1 according to the present embodiment includes a liquid crystal display panel 2, a driving circuit for driving the liquid crystal display panel 2, a control circuit 3 for controlling driving of the driving circuit, and, as needed, a backlight unit (not illustrated), etc.

The driving circuit includes a gate driving circuit 4 for driving scanning signal lines (gate bus lines) 21 in the liquid crystal display panel 2, a source driving circuit 5 for driving data signal lines (signal wires, source bus lines) 22 in the liquid crystal display panel 2, and a Cs driving circuit 6 for driving auxiliary capacitor lines (Cs bus lines) 14 in the liquid crystal display panel 2.

The gate driving circuit 4, the source driving circuit 5, and the Cs driving circuit 6 are electrically connected to the scanning signal lines 21, the data signal lines 22, and the auxiliary capacitor lines 14, respectively, and are designed to give potentials to their respective bus lines independently of outside. These driving circuits are each electrically connected to the control circuit 3, and are controlled by control signals and video signals supplied from the control circuit 3.

The scanning signal lines 21 and the data signal lines 22 intersect with each other as shown in (a) of FIG. 2. Each of those regions surrounded by the scanning signal lines 21 and the data signal lines 22 corresponds to a single pixel. The liquid crystal display panel 2 includes an active matrix substrate 10 (thin-film transistor substrate), which will be described later, and a counter substrate 20. The active matrix substrate 10 has a plurality of pixels 7 arrayed in a matrix manner. Further, as will be described in detail later, the pixels 7 are each constituted by a pixel electrode and a switching element. It should be noted that the term "pixel section" in the Claims corresponds to a group of pixels 7 arrayed in a matrix manner and that the term "pixel electrode section" in the Claims corresponds to a pixel electrode constituting each pixel 7.

The liquid crystal display device 1' shown in (b) of FIG. 2 differs from the liquid crystal display device 1 shown in (a) of FIG. 2 only in the absence of auxiliary capacitor lines (Cs bus lines) 14 and a driving circuit 6 for driving them. The other components of the liquid crystal display device 1' have the same functions as those of the liquid crystal display device 1. Therefore, the liquid crystal display device 1' is not described here.

(Active Matrix Substrate 10)

A characteristic configuration of the active matrix substrate 10 is described with reference to FIG. 1. As shown in FIG. 1, the active matrix substrate 10 constitutes the liquid crystal display panel 2 in combination with the counter substrate 20 and a liquid crystal layer 30. The active matrix substrate 10 includes a transparent insulating substrate 11, pixel electrodes 12, drain lines (metal wires) 13, and the auxiliary capacitor lines 14. The pixel electrodes 12 are each provided with a slit (alignment control space section) 15. The provision of the slit 15 causes a change in the shape of equipotential surfaces, thereby controlling the orientation of alignment of liquid crystal molecules.

Moreover, as shown in FIG. 1, the active matrix substrate 10 is characterized in that in a region of intersection between a slit 15 in a pixel electrode 12 and a scanning signal line 21 or an auxiliary capacitor line 14, a metal layer constituted by a drain line 13 is provided in such a way as to cover at least the scanning signal line 21 or the auxiliary capacitor line 14.

Alternatively, the active matrix substrate 10 may also be configured such that in a region of intersection between a slit 15 in a pixel electrode 12 and a scanning signal line 21 or an auxiliary capacitor line 14, a metal layer constituted by a data signal line 22 is provided in such a way as to cover the scanning signal line 21 or the auxiliary capacitor line 14.

Alternatively, the active matrix substrate 10 may also be configured such that in a region of intersection between a slit 15 in a pixel electrode 12 and a scanning signal line 21 or an auxiliary capacitor line 14, a metal layer constituted by an intermediate electrode or by an independent shield metal is provided in such a way as to cover the scanning signal line 21 or the auxiliary capacitor line 14.

Figure 12:
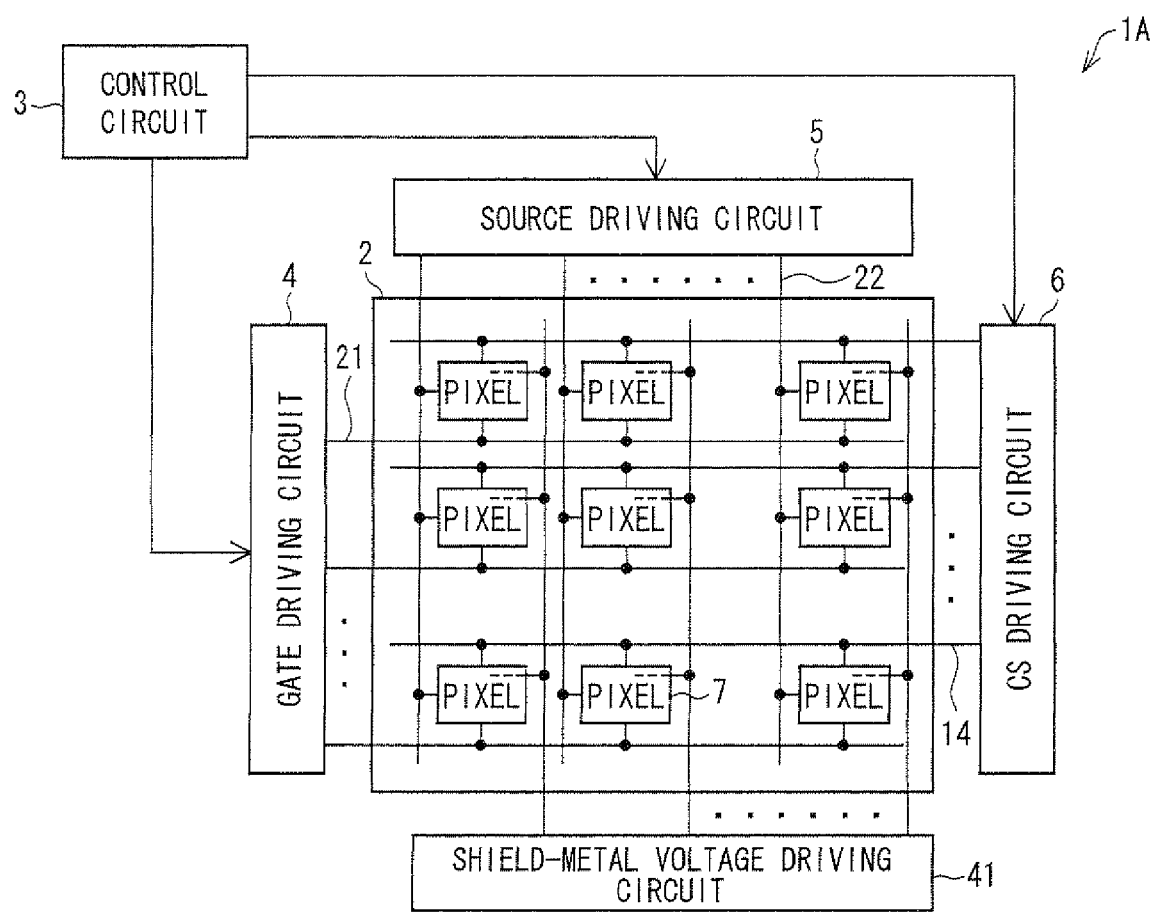
FIG. 12

In the case of formation of the metal layer by an independent shield metal, a shield-metal voltage driving circuit is provided to freely set the potential of the metal layer in the most preferable one of first to third states of potential, which will be described later. FIG. 12 shows a liquid crystal display device 1A obtained by incorporating a shield-metal voltage driving circuit 41 into a liquid crystal display device 1 as shown in (a) of FIG. 2.

In FIG. 12, the shield-metal voltage driving circuit 41 is disposed opposite the source driving circuit 5 across the liquid crystal display panel 2. This does not imply any limitation, and it is possible to use any circuit layout.

A process for manufacturing an active matrix substrate includes the step of, in a region of intersection between a slit 15 in a pixel electrode 12 and an auxiliary capacitor line 14 or a scanning signal line 21, forming at least a data signal line 22, a drain line 13, an intermediate electrode, or an independent shield metal between a layer of the pixel electrode 12 and a layer of the auxiliary capacitor line 14 or of the scanning signal line 21 in such a way that at least the auxiliary capacitor line 14 or the scanning signal line 21 is covered.

(PSA Step)

For an improvement in display performance of a liquid crystal display device, it is necessary, at the stage of manufacturing the liquid crystal display panel, to control a pretilt angle for a satisfactory state of alignment of liquid crystal molecules. An example of a method for controlling a pretilt angle is a PSA (polymer sustained alignment) treatment. The PSA treatment is a process by which the direction in which the liquid crystals lean is memorized by mixing polymerizable monomers into the liquid crystals and polymerizing the monomers with light, heat, or the like in the presence of voltage being applied to the liquid crystals. This makes it possible to achieve a structure that is faster in response speed and unlikely to suffer from a disturbance in liquid crystal alignment, for example, even when pressed with a finger, even if the structure is based on a pixel design that is weak in alignment controllability for the purpose of a larger aperture ratio or the like.

Further, a liquid crystal display panel of the CS-COM voltage application type, i.e., a type of liquid crystal display panel that is driven by applying voltage to each auxiliary capacitor line (CS) and a common electrode (COM) and thereby applying voltage between each pixel electrode and the common electrode via an auxiliary capacitor, has conventionally been configured as shown in FIG. 11. In the case of normal driving of a liquid crystal display panel of the CS-COM voltage application type, those liquid crystals aligned near a projection provided on the common electrode and those liquid crystals aligned near a slit provided in the pixel electrode lean in the same direction, as shown in (a) of FIG. 11.

However, in such a conventional configuration, those liquid crystals aligned near the projection provided on the common electrode and those liquid crystals aligned near the slit provided in the pixel electrode lean in opposite directions, as shown in (b) of FIG. 11, due to voltage that is applied to the common electrode, the pixel electrode, and the auxiliary capacitor line at a PSA step in the process of manufacturing the liquid crystal display panel.

On the other hand, because of the active matrix substrate 10 configured as described above, the liquid crystal display panel 2 according to the present invention makes it possible to give a desired pretilt angle to liquid crystal molecules at a PSA step in the process of manufacturing the liquid crystal display panel 2. The liquid crystal display panel 2 according to the present invention is described in more detail below.

(Liquid Crystal Display Panel 2)

The liquid crystal display panel 2 has a pair of substrates disposed to face each other, namely the active matrix substrate 10 and the counter substrate 20, with the liquid crystal layer 30 sandwiched between the active matrix substrate 10 and the counter substrate 20. Wave plates and polarizing plates (not illustrated) may be provided as needed on the outer surfaces of the active matrix substrate 10 and the counter substrate 20 (on those surfaces of the active matrix substrate 10 and the counter substrate 20 which face away from those surfaces of the active matrix substrate 10 and the counter substrate 20 which face each other).

The counter substrate 20 includes a transparent insulating substrate 16 and a common electrode 17. The common electrode 17 has a rib 18 provided on a surface thereof which faces a pixel electrode 12. The provision of the rib 18 gives a pretilt angle to those liquid crystal molecules located near the rib and, upon application of voltage, allows the other liquid crystal molecules to align themselves along the alignment of those liquid crystal molecules given the pretilt angle. Therefore, the provision of the rib 18 on a surface of the liquid crystal layer makes it possible to more stably control the orientation of alignment of the liquid crystal molecules by applying voltage.

The common electrode 17, formed substantially all over the transparent insulating substrate 16, is used as an electrode common to all the pixels 7 (i.e., as a common electrode). Moreover, an electric field is applied to the liquid crystal layer 30 by voltage applied to the common electrode 17 and the pixel electrode 12, whereby the liquid crystal layer 30 has its optical transmittance modulated so that an image is formed.

Although, in the present embodiment, a structure for controlling the alignment of liquid crystal molecules is prepared by providing the common electrode 17 with the rib 18, such a structure may be prepared by providing a slit instead of the rib (alignment control section) 18. Further, in the liquid crystal display panel 2, such a structure needs only be prepared by providing the pixel electrode 12 with a slit, and the common electrode 17 does not necessarily need be provided with such a structure.

Moreover, as described above, the liquid crystal display panel 2 includes the active matrix substrate 10 wherein in a region of intersection between a slit 15 and an auxiliary capacitor line 14 or a scanning signal line 21, at least a data signal line 22 or a drain line 13 is provided between a layer of a pixel electrode 12 and a layer of the auxiliary capacitor line 14 or of the scanning signal line 21 in such a way as to cover at least the auxiliary capacitor line 14 or the scanning signal line 21.

This configuration allows at least the auxiliary capacitor line 14 or the scanning signal line 21 to be covered by the metal layer such as the data signal line 22, the drain line 13, the intermediate electrode, or the independent shield metal so that there is no direct overlap between the slit 15 and the auxiliary capacitor line 14 or the scanning signal line 21.

Moreover, at the PSA step in the process of manufacturing the liquid crystal display panel 2, for example, such voltage may be applied to the auxiliary capacitor line 14 or the scanning signal line 21 that (Potential of Auxiliary Capacitor Line 14 (Scanning Signal Line 21)−Potential of Common Electrode 17) is equal in polarity to (Potential of Pixel Electrode 12−Potential of Common Electrode 17) and that |Potential of Auxiliary Capacitor Line 14 (Scanning Signal Line 21)−Potential of Common Electrode 17|>|Potential of Pixel Electrode 12−Potential of Common Electrode 17|. In such a case, the potential of the metal layer is set lower than or equal to that of the pixel electrode.

That is, the potential of the metal layer is set to form a first state of potential where a potential difference obtained by subtracting the potential of the common electrode 17 from the potential of the metal layer is opposite in polarity to a potential difference obtained by subtracting the potential of the common electrode 17 from the potential of the pixel electrode 12, a second state of potential where the potential of the metal layer is equal to the potential of the common electrode 17, or a third state of potential where the potential difference obtained by subtracting the potential of the common electrode 17 from the potential of the metal layer is equal in polarity to the potential difference obtained by subtracting the potential of the common electrode 17 from the potential of the pixel electrode 12 and where the absolute value of a difference between the potential of the pixel electrode 12 and the potential of the common electrode is greater than or equal to the absolute value of a difference between the potential of the metal layer and the potential of the common electrode 17. Then, by applying voltage to the liquid crystal layer 30 to polymerize the monomers mixed in advance into the liquid crystal layer 30, the liquid crystal molecules 101 and 102 of the liquid crystal layer 30 can be given a pretilt angle.

Further, during normal actual driving of the liquid crystal display panel, such voltage may be applied to the auxiliary capacitor line 14 or the scanning signal line 21 that (Potential of Auxiliary Capacitor Line 14 (Scanning Signal Line 21)−Potential of Common Electrode 17) is equal in polarity to (Potential of Pixel Electrode 12−Potential of Common Electrode 17) and that |Potential of Auxiliary Capacitor Line 14 (Scanning Signal Line 21)−Potential of Common Electrode 17|>|Potential of Pixel Electrode 12−Potential of Common Electrode 17|. In such a case, the potential of the metal layer is set lower than or equal to that of the pixel electrode. That is, the potential of the metal layer set to form the first state of potential where the potential difference obtained by subtracting the potential of the common electrode 17 from the potential of the metal layer is opposite in polarity to the potential difference obtained by subtracting the potential of the common electrode 17 from the potential of the pixel electrode 12, the second state of potential where the potential of the metal layer is equal to the potential of the common electrode 17, or the third state of potential where the potential difference obtained by subtracting the potential of the common electrode 17 from the potential of the metal layer is equal in polarity to the potential difference obtained by subtracting the potential of the common electrode 17 from the potential of the pixel electrode 12 and the absolute value of the difference between the potential of the pixel electrode 12 and the potential of the common electrode 17 is greater than or equal to the absolute value of the difference between the potential of the metal layer and the potential of the common electrode 17. Then, voltage can be applied to the liquid crystal layer 30.

That is, the potential V of the metal layer can be set in one of the following states (1) to (3):

(1) V−Vcom is opposite in potential to Vd−Vcom;
(2) V=Vcom; and
(3) V−Vcom is equal in potential to Vd−Vcom, and |Vd−Vcom|≥|V−Vcom|, where V is the potential of the metal layer, Vcom is the potential of the common electrode, and Vd is the potential of the pixel electrode.

It should be noted here that the first to third states of potential correspond to the states (1) to (3), respectively.

Thus, in the region of intersection between the slit 15 and the auxiliary capacitor line 14 or the scanning signal line 21, the metal layer whose potential has been set to form the first, second, or third state of potential is placed between the layer of the scanning signal line 21 or of the auxiliary capacitor line 14 and the layer of the pixel electrode 12; therefore, the influence of the potential of the scanning signal line 21 or of the auxiliary capacitor line 14 can be blocked.

This makes it possible to prevent a defect in alignment that has conventionally been caused when such voltage is applied to the auxiliary capacitor line 14 or the scanning signal line 21 during the PSA step or during normal driving that (Potential of Auxiliary Capacitor Line 14 (Scanning Signal Line 21)−Potential of Common Electrode 17) is equal in polarity to (Potential of Pixel Electrode 12−Potential of Common Electrode 17) and that |Potential of Auxiliary Capacitor Line 14 (Scanning Signal Line 21)−Potential of Common Electrode 17|>|Potential of Pixel Electrode 12−Potential of Common Electrode 17|.

This makes it possible, during actual driving or manufacture of the liquid crystal display panel 2, to keep the alignment of the liquid crystal molecules 101 good and align the liquid crystal molecules appropriately, with no influence on the alignment of the liquid crystal molecules 101 by those equipotential surfaces formed in an area of the liquid crystal layer 30 around the slit 15 intersecting with the scanning signal line 21 or the auxiliary capacitor line 14, thus bringing about an improvement in display quality of the liquid crystal display panel 2.

It should be noted that in which one of the first to third states of potential the potential V of the metal layer can be set during actual driving of the liquid crystal display panel 2 depends on what is used as the metal. This point is discussed more specifically.

First, when the metal layer is constituted by an independent shield metal, the shield-metal voltage driving circuit 41 makes it possible to freely set the potential V of the shield metal; therefore, it is possible to freely choose any one of the states of potential (1) to (3) as the potential V.

Next, when the metal layer is constituted by a drain line 13 or an intermediate electrode, the drain line 13 or the intermediate electrode is always equal in potential to the pixel electrode 12; therefore, the potential V is set as V−Vcom=Vd−Vcom included in the state of potential (3).

Furthermore, when the metal layer is constituted by a data signal line 22, the potential V of the data signal line 22 swings between positive and negative polarities with the potential Vcom of the common electrode as the center and therefore is equal to the potential Vcom on an average. Therefore, the potential V is set in the state of potential (2) (V=Vcom).

It should be noted that the active matrix substrate 10 may be configured to have such a structure that a metal wiring layer including scanning signal lines 21 and auxiliary capacitor lines 14, a gate insulating layer, a metal wiring layer including data signal lines 22 and drain lines (metal wires) 13, an insulating layer, a resin layer, and pixel electrodes 12 have been formed in this order on a transparent insulating substrate made of glass or the like.

Further, the counter substrate 20 may be a CF substrate obtained, for example, by stacking a color filter layer, a black matrix, and a common electrode in this order on that surface of a transparent insulating layer which faces the active matrix substrate 10. Further, the counter substrate 20 may be provided, as needed, with functional layers (not illustrated) such as an undercoat layer (foundation layer) and an overcoat layer (planarizing layer).

Further, the common electrode 17 and the pixel electrodes 12 may each be a transparent electrode formed by a transparent conductive film made of ITO (indium tin oxide) or the like.

Meanwhile, examples of a slit 15 in a pixel electrode include: an ordinary slit, which is a long narrow hole provided partially in the pixel electrode; a fine slit, which is a long narrow space provided, for example, by making a combtooth cut in the pixel electrode; a slit that is a space between adjacent pixel electrodes (such a slit being hereinafter referred to as "inter-pixel slit"); and the like. Accordingly, the following describes specific example configurations according to categories of slits in pixel electrodes.

(Slit 15*a*)

Figure 3:
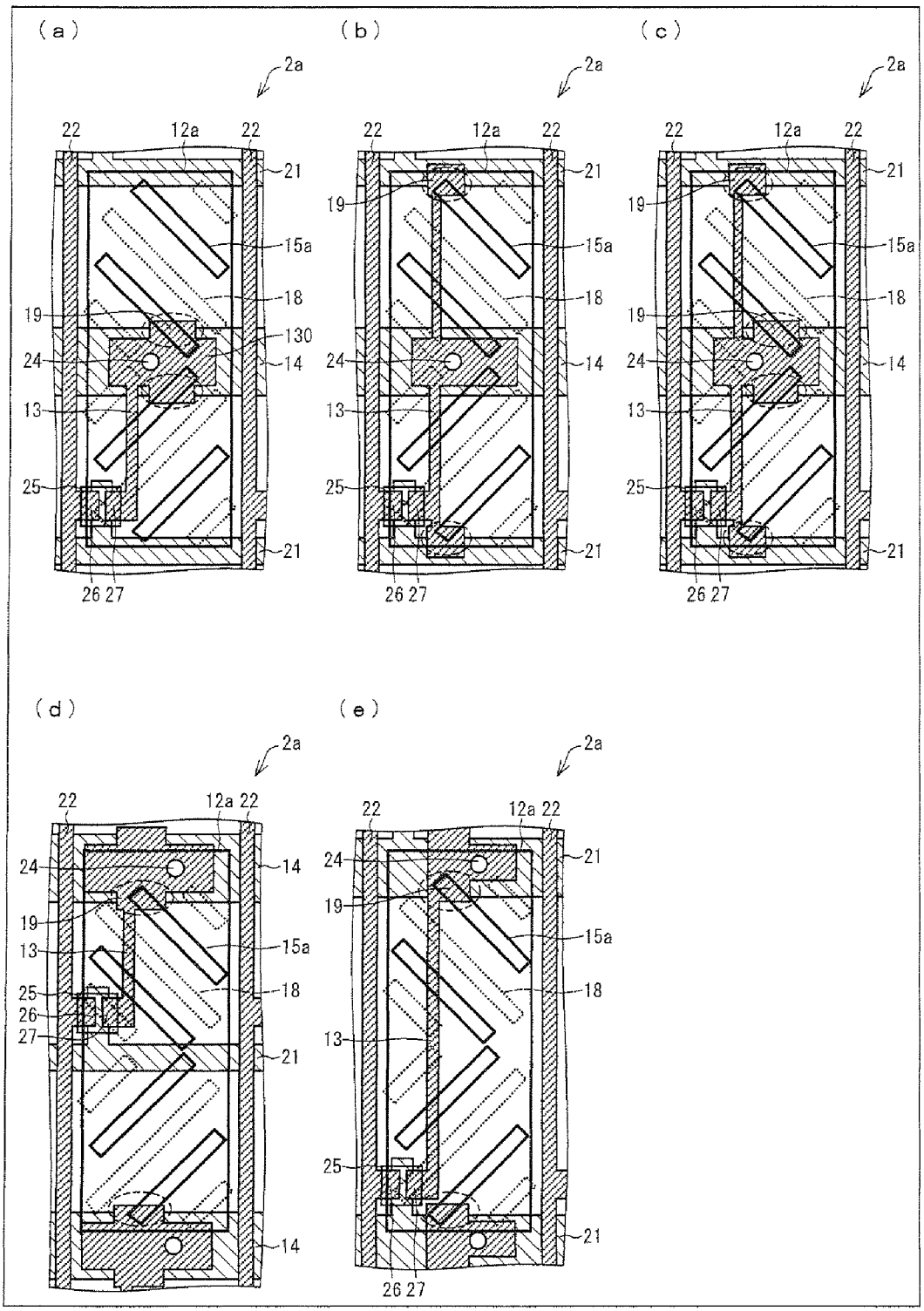
FIG. 3

FIG. 3 includes plan views schematically showing example configurations of liquid crystal display panels 2*a* having pixel electrodes provided with ordinary slits according to the present embodiment, respectively. As shown in (a) to (e) of FIG. 3, provided at each of the intersections between the scanning signal lines 21 and the data signal lines 22 are a pixel electrode 12*a* serving as a pixel electrode section and a TFT (thin-film transistor) 25 serving as a switching element. Further, the TFT 25 is provided in a corner (corner portion) of or in the vicinity of a side of (in a side edge portion of) the pixel electrode 12*a*. The pixel electrode 12*a* and the TFT 25 constitute a pixel 7 of FIG. 1 in combination with a common electrode 17 (not illustrated).

Further, as shown in (a) to (e) of FIG. 3, the pixel electrode 12*a* is provided with long narrow holes serving as slits 15*a*, and the common electrode 17 (not illustrated) is provided with ribs 18. In the configurations shown in (a) to (e) of FIG. 3, the slits 15*a* and the ribs 18 extend substantially in parallel with each other. Further, with the relationship of disposition between the slits 15*a* and the ribs 18 viewed two-dimensionally, the slits 15*a* and the ribs 18 appear to be alternately disposed. Moreover, if, in the configurations shown in (a) to (e) of FIG. 3, each pixel were divided into two regions by drawing a boundary parallel to the scanning signal line 21 so that the boundary passes transversely across the center of the pixel electrode 12*a*, those slits 15*a* and ribs 18 disposed in one of the regions and those slits 15*a* and ribs 18 disposed in the other region would be disposed in such a way as to be close to each other at a sharp angle at the boundary, respectively, and to be symmetrical with each other.

Thus, at the site where the plurality of slits 15*a* and ribs 18 are close to each other at a sharp angle, respectively, the alignment of liquid crystal molecules is different from that which is originally intended to be obtained, so that there appear dark lines. Therefore, such a site constitutes a non-display region and, as shown (a) to (c) of FIG. 3, serves as a convenient site for an auxiliary capacitor line 14 to pass through. The same applies to those configurations shown in FIGS. 6 to 8, which will be described later.

It should be noted that there may be a configuration having a scanning signal line 21 passing through the site where the plurality of slits 15*a* and ribs 18 are close to each other at a sharp angle, respectively, as shown in (d) of FIG. 3. Furthermore, there may be a configuration having no auxiliary capacitor line 14 passing through the site, as shown in (e) of FIG. 3. The present invention is not limited to any one of these configurations.

As shown in (a) to (e) of FIG. 3, the TFT 25 includes a gate electrode, a gate insulating film, a semiconductor layer, a source electrode 26, and a drain electrode 27. Electrically connected to the gate electrode of the TFT 25 is a scanning signal line 21, part of which functions as the gate electrode. Further electrically connected to the source electrode 26 is a data signal line 22.

The TFT 25 carries out a switching operation in accordance with a scanning signal supplied from the scanning signal line 21 to switch the pixel electrode 12*a* and the data signal line 22 between a conducting state and a non-conducting state. Moreover, in the conducting state, a voltage corresponding to a data signal representing an image supplied from the data signal line 22 is supplied to the pixel electrode 12*a* through a drain line 13.

Further, the auxiliary capacitor line 14 is provided in the same layer as the scanning signal line 21. Furthermore, each of the pixel electrodes 12*a* has a drain line 13, provided in a layer above the auxiliary capacitor line 14 with a gate insulating film (not illustrated) sandwiched therebetween, which extends from the drain electrode 27 to a position directly above the auxiliary capacitor line 14 or the scanning signal line 21. Moreover, the drain line 13, disposed directly above the auxiliary capacitor line 14 or the scanning signal line 21, has an auxiliary capacitor electrode section 130 (see (a) of FIG. 3), provided in an overlap section with the auxiliary capacitor line 14, which serves to enlarge the area of overlap between the auxiliary capacitor line 14 and the drain line 13. Furthermore, the drain line 13 is electrically connected to the pixel electrode 12*a* through a contact hole 24 provided in the auxiliary capacitor electrode section 130. Thus, in a configuration having an auxiliary capacitor line 14, the auxiliary capacitor line 14 forms an auxiliary capacitor with a pixel electrode 12*a* in each pixel. This makes it possible to stabilize the potential of each pixel.

In an example configuration of a liquid crystal display panel 2*a* as shown in (a) of FIG. 3, the scanning signal lines 21 extend along upper and lower edges of the pixel electrode 12*a*, respectively, and the auxiliary capacitor line 14 extends in such a way as to pass transversely across the center of the pixel electrode 12*a* substantially in parallel with the scanning signal lines 21. Moreover, in each region of intersection (surrounded by a dotted line) between the open region of a slit 15*a* provided in the pixel electrode 12*a* and the auxiliary capacitor line 14 passing transversely across the center of the pixel electrode 12*a*, a covering metal section 19 (metal layer) composed of the drain line 13 in such a way as to cover at least the auxiliary capacitor line 14 is provided as part of the auxiliary capacitor electrode section 130 between the layer of the pixel electrode 12a and the layer of the auxiliary capacitor line 14.

In an example configuration of a liquid crystal display panel 2a as shown in (b) of FIG. 3, the scanning signal lines 21 extend along upper and lower edges of the pixel electrode 12a, respectively, and the auxiliary capacitor line 14 extends in such a way as to pass transversely across the center of the pixel electrode 12a substantially in parallel with the scanning signal lines 21. Moreover, in each region of intersection (surrounded by a dotted line) between the open region of a slit 15a provided in the pixel electrode 12a and the scanning signal line 21 passing transversely along the upper or lower edge of the pixel electrode 12a, a covering metal section 19 (metal layer) composed of the drain line 13 in such a way as to cover at least the scanning signal line 21 is provided between the layer of the pixel electrode 12a and the layer of the scanning signal line 21.

In an example configuration of a liquid crystal display panel 2a as shown in (e) of FIG. 3, the scanning signal lines 21 extend along upper and lower edges of the pixel electrode 12a, respectively, and the auxiliary capacitor line 14 extends in such a way as to pass transversely across the center of the pixel electrode 12a substantially in parallel with the scanning signal lines 21. Moreover, in each region of intersection (surrounded by a dotted line) between the open region of a slit 15a provided in the pixel electrode 12a and the auxiliary capacitor line 14 passing transversely across the center of the pixel electrode 12a, a covering metal section 19 (metal layer) composed of the drain line 13 in such a way as to cover at least the auxiliary capacitor line 14 is provided as part of the auxiliary capacitor electrode section 130 between the layer of the pixel electrode 12a and the layer of the auxiliary capacitor line 14. Furthermore, in each region of intersection (surrounded by a dotted line) between the open region of a slit 15a provided in the pixel electrode 12a and the scanning signal line 21 passing transversely along the upper or lower edge of the pixel electrode 12a, a covering metal section 19 (metal layer) composed of the drain line 13 in such a way as to cover at least the scanning signal line 21 is provided between the layer of the pixel electrode 12a and the layer of the scanning signal line 21.

In an example configuration of a liquid crystal display panel 2a as shown in (d) of FIG. 3, the scanning signal line 21 extends in such a way as to pass transversely across the center of the pixel electrode 12a, and the auxiliary capacitor lines 14 extend along upper and lower edges of the pixel electrode 12a, respectively. Moreover, in each region of intersection (surrounded by a dotted line) between the open region of a slit 15a provided in the pixel electrode 12a and the auxiliary capacitor line 14 passing transversely along the upper or lower edge of the pixel electrode 12a, a covering metal section 19 (metal layer) composed of the drain line 13 in such a way as to cover at least the auxiliary capacitor line 14 is provided between the layer of the pixel electrode 12a and the layer of the auxiliary capacitor line 14.

Alternatively, the example configuration of the liquid crystal display panel 2a as shown in (d) of FIG. 3 may also be configured such that in each region of intersection between the open region of a slit 15a provided in the pixel electrode 12a and the scanning signal line 21 passing transversely across the center of the pixel electrode 12a, a covering metal section 19 (metal layer) composed of the drain line 13 in such a way as to cover at least the scanning signal line 21 is provided between the layer of the pixel electrode 12a and the layer of the scanning signal line 21.

In an example configuration of a liquid crystal display panel 2a as shown in (e) of FIG. 3, no auxiliary capacitor line 14 is provided, and the scanning signal lines 21 extend along upper and lower edges of the pixel electrode 12a, respectively. That is, the liquid crystal display panel 2a shown in (e) of FIG. 3 is a liquid crystal display panel that constitutes a liquid crystal display device 1 as shown in (b) of FIG. 2. Moreover, in each region of intersection (surrounded by a dotted line) between the open region of a slit 15a provided in the pixel electrode 12a and the scanning signal line 21 passing transversely along the upper or lower edge of the pixel electrode 12a, a covering metal section 19 (metal layer) composed of the drain line 13 in such a way as to cover at least the scanning signal line 21 is provided between the layer of the pixel electrode 12a and the layer of the scanning signal line 21.

Further, although, in each of the examples shown in (a) through (e) of FIG. 3, the covering metal section 19 is constituted by the drain line 13, the covering metal section may be constituted by a data signal line 22, an intermediate electrode (not illustrated), or an independent shield metal (not illustrated).

It should be noted that each of the examples shown in FIG. 3 shows a configuration in which the covering metal section 19 stretches into a region where there is no intersection between the open region of the slit 15 and the scanning signal line 21 or the auxiliary capacitor line 14. The greater the extent to which the covering metal section 19 stretches into the region is, the more profound the effect of suppressing a disturbance in alignment becomes. However, this adversely results in a disadvantageous aperture ratio. Therefore, the extent to which the covering metal section 19 stretches into the region is determined by a balance between disturbance in alignment and aperture ratio according to the required specifications.

(Slit 15b)

Figure 4A:
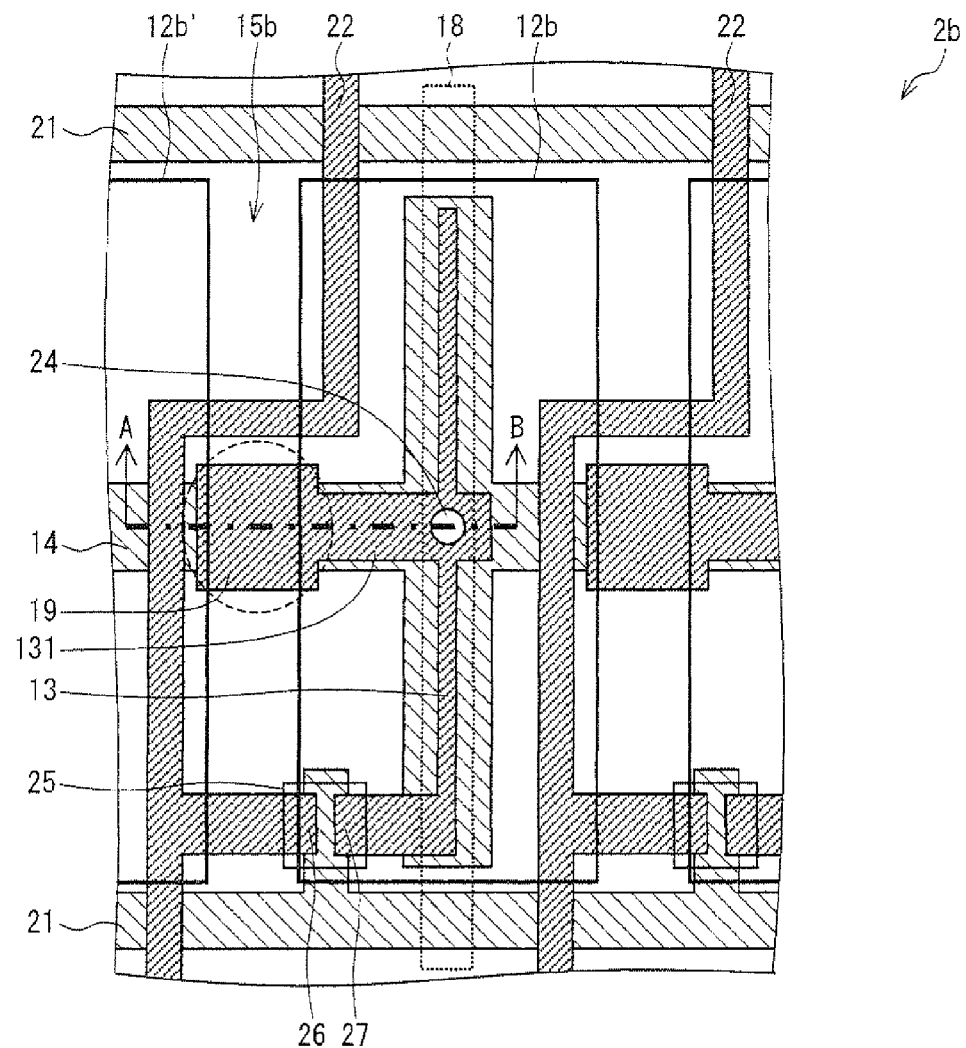
Figure 4B:
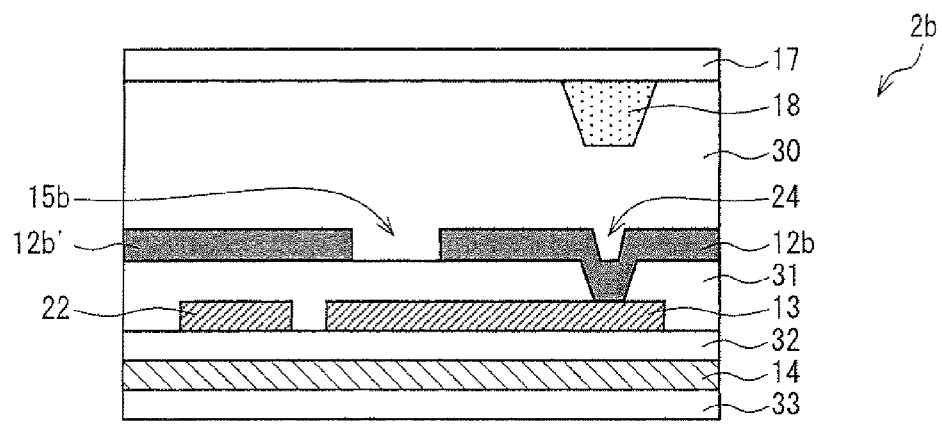
FIG. 4b

FIGS. 4a and 4b show the configuration of a liquid crystal display panel 2b provided with an inter-pixel slit according to the present embodiment. FIG. 4a is a plan view schematically showing the configuration of the liquid crystal display panel, and FIG. 4b is a cross-sectional view of a region taken along line A-B in FIG. 4a.

As shown in FIG. 4a, provided at each of the intersections between the scanning signal lines 21 and the data signal lines 22 are a pixel electrode 12b serving as a pixel electrode section and a TFT (thin-film transistor) 25 serving as a switching element. The configuration shown in FIG. 4a is the same as those shown in FIG. 3 in that the pixel electrode 12b and the TFT 25 constitute a pixel 7 of FIG. 1 in combination with a common electrode 17 (not illustrated). Further, the structure and operation of the TFT 25 are the same as those shown in FIG. 3 and, as such, are not described here. However, the configuration shown in FIG. 4a is different from those shown in FIG. 3 in that the space between the pixel electrode 12b and a pixel electrode 12b' adjacent thereto functions as a slit 15b. Further, the common electrode 17 (not illustrated) is provided with a rib 18, and the rib 18 extends substantially in parallel with the inter-pixel slit 15b.

Further, as shown in FIG. 4a, the auxiliary capacitor line 14 extends substantially in parallel with the scanning signal lines 21, passing transversely across the pixel electrode 12b. It should be noted that the scanning signal lines 21 are provided in the same layer in which the auxiliary capacitor line 14 shown in FIG. 4b is provided. Furthermore, the auxiliary capacitor line 14 also extends along longer sides of the pixel electrode 12b (the longer sides being substantially perpendicular to the scanning signal lines 21) in a position directly below the pixel electrode 12b. It should be noted that the common electrode 17 is provided with the rib 18, which extends in parallel with that part of the auxiliary capacitor line 14 which extends along the longer sides of the pixel electrode 12b.

Furthermore, as shown in FIGS. 4a and 4b, each of the pixel electrodes 12 has a drain line 13 provided in a layer above the auxiliary capacitor line 14 formed on a glass substrate 33, with a gate insulating film 32 sandwiched between the drain line 13 and the auxiliary capacitor line 14, and the drain line 13 extends from the drain electrode 27 along that part of the auxiliary capacitor line 14 which extends along the longer sides of the pixel electrode 12b.

Moreover, the drain line 13, extending along the longer sides of the pixel electrode 12b, has an auxiliary capacitor electrode section 131 provided in a position of intersection between the drain line 13 and that part of the auxiliary capacitor line 14 which extends in parallel with the scanning signal lines 21, and the auxiliary capacitor electrode section 131 serves to enlarge the area of overlap between the auxiliary capacitor line 14 and the drain line 13. Furthermore, the drain line 13 is electrically connected to the pixel electrode 12b through a contact hole 24 provided in an interlayer insulating film 31. Thus, the auxiliary capacitor line 14 and the pixel electrode 12b form an auxiliary capacitor in each pixel. This makes it possible to stabilize the potential of each pixel.

In the configuration shown in FIGS. 4a and 4b, the region in the common electrode 17 (not illustrated) where the rib 18 is provided is low in efficiency of transmission. This low-transmittance region is utilized for a greater auxiliary capacitance by providing the auxiliary capacitor line 14 so that it not only extends in parallel with the scanning signal lines 21 but also extends along the longer sides of the pixel electrode 12b.

Moreover, in the liquid crystal panel 2b, as shown in FIG. 4a, in a region of intersection (surrounded by a dotted line) between the open region of the slit 15b (i.e., the space between the pixel electrodes 12b and 12b') and the auxiliary capacitor line 14, a covering metal section 19 composed of the drain line 13 in such a way as to cover at least the auxiliary capacitor line 14 is provided as part of the auxiliary capacitor electrode section 131 between the layer of the pixel electrode 12b and the layer of the auxiliary capacitor line 14.

It should be noted that as with the examples shown in FIG. 3, the example shown in FIGS. 4a and 4b shows a configuration in which the covering metal section 19 stretches into a region where there is no intersection between the open region of the slit 15b and the auxiliary capacitor line 14. The extent to which the covering metal section 19 stretches into the region is determined by a balance between disturbance in alignment and aperture ratio according to the required specifications.

FIG. 5 is a plan view schematically showing the configuration of another liquid crystal display panel 2b' provided with an inter-pixel slit according to the present embodiment. In the liquid crystal panel 2b', as shown in FIG. 5, in a region of intersection (surrounded by a dotted line) between the open region of a slit 15b (i.e., a space between pixel electrodes 12b and 12b') and an auxiliary capacitor line 14, a covering metal section 19 composed of a data signal line 22 in such a way as to cover at least the auxiliary capacitor line 14 is provided between the layer of the pixel electrode 12b and the layer of the auxiliary capacitor line 14. It should be noted that the covering metal section 19 is formed by locally expanding the width of the data signal line 22.

That is, although the configuration shown in FIGS. 4a and 4b is a configuration having a drain line 13 formed in such a way as to cover that region of an auxiliary capacitor line 14 which intersect with the open region of a slit 15b, there may be a configuration having a data signal line 22 formed in such a way as to cover that region of an auxiliary capacitor line 14 which intersects with the open region of a slit 15b, as shown in FIG. 5. It should be noted that the configuration shown in FIG. 5 is the same as those shown in FIG. 3, except for the data signal line 22 is provided in such a way as to cover that region of the auxiliary capacitor line 14 which intersects with the open region of the slit 15b, and, as such, is not described here.

(Slit 15c)

Figure 6:
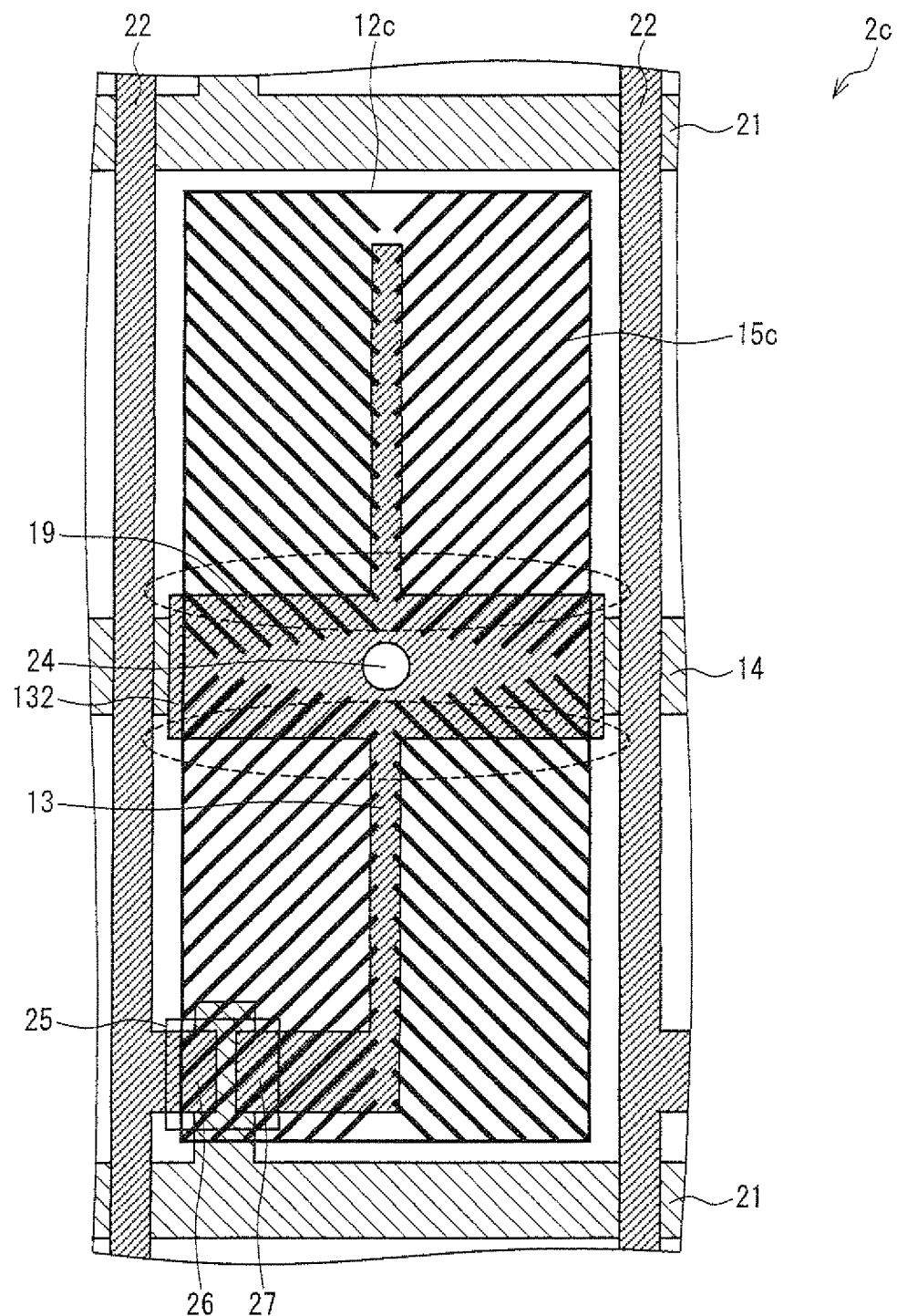
FIG. 6

FIG. 6 is a plan view schematically showing the configuration of a liquid crystal display panel 2c having a pixel electrode provided with fine such fine slits as mentioned above according to the present embodiment. As shown in FIG. 6, provided at each of the intersections between the scanning signal lines 21 and the data signal lines 22 are a pixel electrode 12c serving as a pixel electrode section and a TFT 25 serving as a switching element. It should be noted that in FIG. 6, those black lines in the pixel electrode 12c represent fine slits 15c; that is, those areas excluding the black lines represent the pixel electrode 12c.

Further, the configuration shown in FIG. 6 is the same as those shown in FIG. 3 in that the pixel electrode 12c and the TFT 25 constitute a pixel 7 of FIG. 1 in combination with a common electrode 17 (not illustrated). Further, the structure and operation of the TFT 25 are the same as those shown in FIG. 3 and, as such, are not described here. However, The configuration shown in FIG. 6 is different from those shown in FIG. 3 in that the pixel electrode is a combtooth electrode and those slits provided in the pixel electrodes are fine slits 15c.

In the configuration shown in FIG. 6, the common electrode 17 (not illustrated) is not provided with a rib 18, but may be provided with a rib 18 for better alignment controllability, without implying any particular limitation on the presence or absence of a rib 18.

Further, each of the fine slits 15c has its longer sides inclined at approximately 45 degrees to the drain line 13, and the fine slits 15c are divided into four groups of fine slits extending along four directions that differ by approximately 90 degrees one after the other, respectively. In such a configuration, when voltage is applied to the pixel electrode 12c, the liquid crystal molecules lean along the longer sides of each of the fine slits 15c, so that four domains different in orientation of alignment can be formed in each pixel. It should be noted that two domains may be formed by forming two groups of fine slits extending longitudinally and transversely, respectively.

Further provided in the same layer as the scanning signal lines 21 is an auxiliary capacitor line 14 extending substantially in parallel with the scanning signal lines 21 and passing transversely across the center of each of the corresponding pixel electrodes 12c. Furthermore, each of the pixel electrodes 12c has a drain line 13, provided in a layer above the auxiliary capacitor line 14 with a gate insulating film (not illustrated) sandwiched therebetween, which extends from the drain electrode 27 along longer sides of the pixel electrode 12c. Moreover, the drain line 13 has an auxiliary capacitor electrode section 132, provided in a position of intersection between the drain line 13 and the auxiliary capacitor line 14, which serves to enlarge the area of overlap between the auxiliary capacitor line 14 and the drain line 13. The drain line 13 is electrically connected to the pixel electrode 12c through a contact hole 24 provided in the auxiliary capacitor electrode section 132. Thus, the auxiliary capacitor line 14 and the pixel electrode 12c form an auxiliary capacitor in each pixel. This makes it possible to stabilize the potential of each pixel.

Moreover, in the liquid crystal display panel 2c, as shown in FIG. 6, in a region of intersection (surrounded by a dotted line) between the open region of a slit 15c provided in the pixel electrode 12c and the auxiliary capacitor line 14, a covering metal section 19 is provided as part of the auxiliary capacitor line 132 between the layer of the pixel electrode 12c and the layer of the auxiliary capacitor line 14 in such a way as to cover the auxiliary capacitor line 14.

It should be noted that as with the examples shown in FIG. 3, the example shown in FIG. 6 shows a configuration in which the covering metal section 19 stretches into a region where there is no intersection between the open region of the slit 15c and the auxiliary capacitor line 14. The extent to which the covering metal section 19 stretches into the region is determined by a balance between disturbance in alignment and aperture ratio according to the required specifications.

(Horizontally Long Picture Element)

Figure 7:
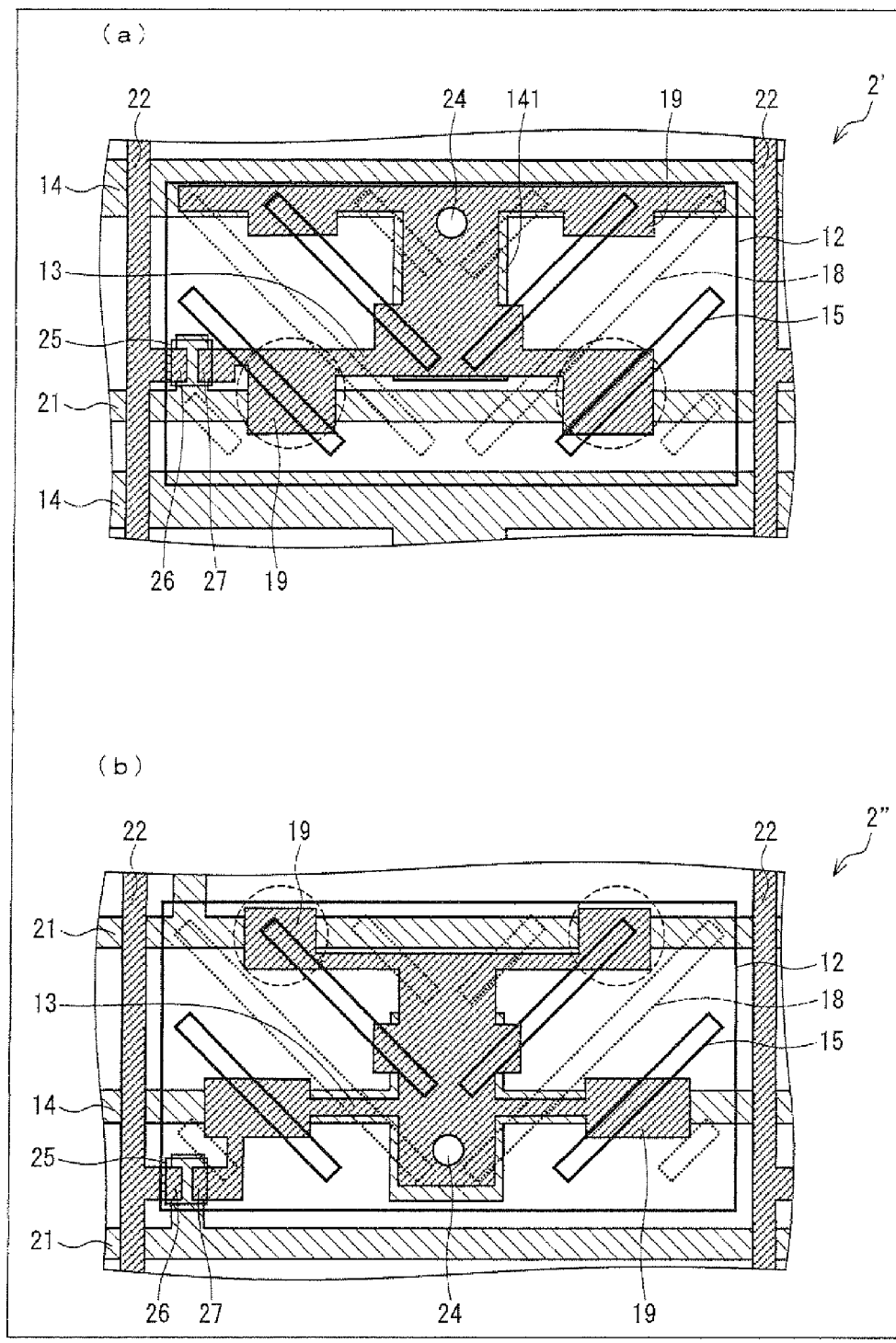
FIG. 7

FIGS. 3 through 5 show the configurations of vertically long picture elements. However, depending on the design of a liquid crystal display panel, there may be a case where each pixel is structured to have a vertical arrangement of horizontally long RGB picture elements. FIG. 7 shows the configuration of a liquid crystal display panel having a pixel structure of horizontally long picture elements, (a) showing a configuration having a scanning signal line 21 formed in such a way as to pass transversely through the region of a pixel electrode 12 along longer sides of the pixel electrode 12, (b) showing a configuration having an auxiliary capacitor line 14 formed in such a way as to pass transversely through the region of a pixel electrode 12 along longer sides of the pixel electrode 12, with the pixel electrode 12 overlapping a scanning signal line 21 in the vicinity of one of the two longer sides.

In FIG. 7, those members which have the same functions as those shown in FIGS. 3 through 5 are given the same reference numerals. Such members are therefore not described here. In the liquid crystal display panel shown in FIG. 7, the pixel electrode overlaps not only an auxiliary capacitor line but also a scanning signal line.

As shown in (a) of FIG. 7, there is a scanning signal line 21 formed toward the center of a pixel electrode 12 having its longer sides extending in parallel with the scanning signal line 21, and there is provided auxiliary capacitor lines 14 extending in parallel with the scanning signal line 21 in such a way as to have overlaps near the longer sides of the pixel electrode 12, respectively. Furthermore, one of the two auxiliary capacitor lines 14 overlapping the pixel electrode 12 has an extended section 141 extending from an area near the center of the longer side of the pixel electrode 12 to the scanning signal line 21 in parallel with the shorter sides of the pixel electrode 12. There are also a plurality of slits 15 formed symmetrically with each other about a center line that divides each of the longer sides of the pixel electrode 12 into two and at sharp angles to the center line.

In such a configuration, there exist a plurality of regions of intersection between the scanning signal line 21 and slits 15 provided in the pixel electrode 12, and there exist a plurality of regions of intersection between the auxiliary capacitor line 14 and slits 15.

Moreover, in the liquid crystal display panel 2', as shown in (a) of FIG. 7, in each of the plurality of regions of intersection (each surrounded by a dotted line) between the open regions of the slits 15 provided in the pixel electrode 12 and the scanning signal line 21, a covering metal section 19 stretching from part of the drain line 13 along the shorter sides of the pixel electrode 12 is provided between the layer of the pixel electrode 12 and the layer of the scanning signal line 21 in such a way as to cover the scanning signal line 21.

Furthermore, the drain line 13 extends up to the auxiliary capacitor line 14 while overlapping the extended section 141 of the auxiliary capacitor line 14 and, further, extends along the longer side of the pixel electrode 12 into the plurality of regions of intersection between the auxiliary capacitor line 14 and the slits 15. In the plurality of regions of intersection between the auxiliary capacitor line 14 and the slits 15, there are provided a plurality of covering metal sections 19 stretching from the drain line 13 in such a way as to cover the respective regions.

Further, even in a case where, as shown in (b) of FIG. 7, the pixel electrode 12 overlaps one of the two scanning signal lines 21 near a longer side of the pixel electrode 12 and there is an auxiliary capacitor line 14 formed toward the center of the pixel electrode 12, there exit a plurality of regions of intersection between the scanning signal line 21 and slits 15 provided in the pixel electrode 12 in the same manner as described above, and there exit a plurality of regions of intersection between the auxiliary capacitor line 14 and slits 15.

Moreover, in the liquid crystal display panel 2', as shown in (b) of FIG. 7, in each of the plurality of regions of intersection (each surrounded by a dotted line) between the open regions of the slits 15 provided in the pixel electrode 12 and the scanning signal line 21, a covering metal section 19 stretching from part of the drain line 13 along the shorter sides of the pixel electrode 12 is provided between the layer of the pixel electrode 12 and the layer of the scanning signal line 21 in such a way as to cover the scanning signal line 21.

Furthermore, in each of the plurality of regions of intersection between the open regions of the slits 15 and the auxiliary capacitor line 14, a covering metal section 19 obtained by widening part of the drain line 13 is provided between the layer of the pixel electrode 12 and the layer of the auxiliary capacitor line 14 in such a way as to cover the auxiliary capacitor line 14. Although, in FIG. 7, the covering metal section 19 is constituted by the drain line 13, the covering metal section 19 may be constituted by a data signal line 22, an intermediate electrode (not illustrated), or an independent shield metal (not illustrated).

Although, in the example shown in FIG. 7, the pixel electrode 12 is horizontally long; that is, the pixel electrode has its longer sides extending in parallel with the scanning signal lines 21, the pixel electrode may be vertically long; that is, the pixel electrode 12 may have its longer sides extending perpendicularly to the scanning signal lines 21.

(Multi-Pixel Structure)

As a technique for improving the dependence of the gamma characteristics of a liquid crystal display panel on viewing angles (difference between the gamma characteristics of a liquid crystal display device as viewed squarely and the gamma characteristics of the device as viewed obliquely), there is a pixel division method (so-called multi-pixel technology). A liquid crystal display panel of the pixel division type has a multi-pixel structure in which each pixel is constituted by a plurality of subpixels. Moreover, the present invention can also be applied to a liquid crystal display panel having a multi-pixel structure.

Figure 8:
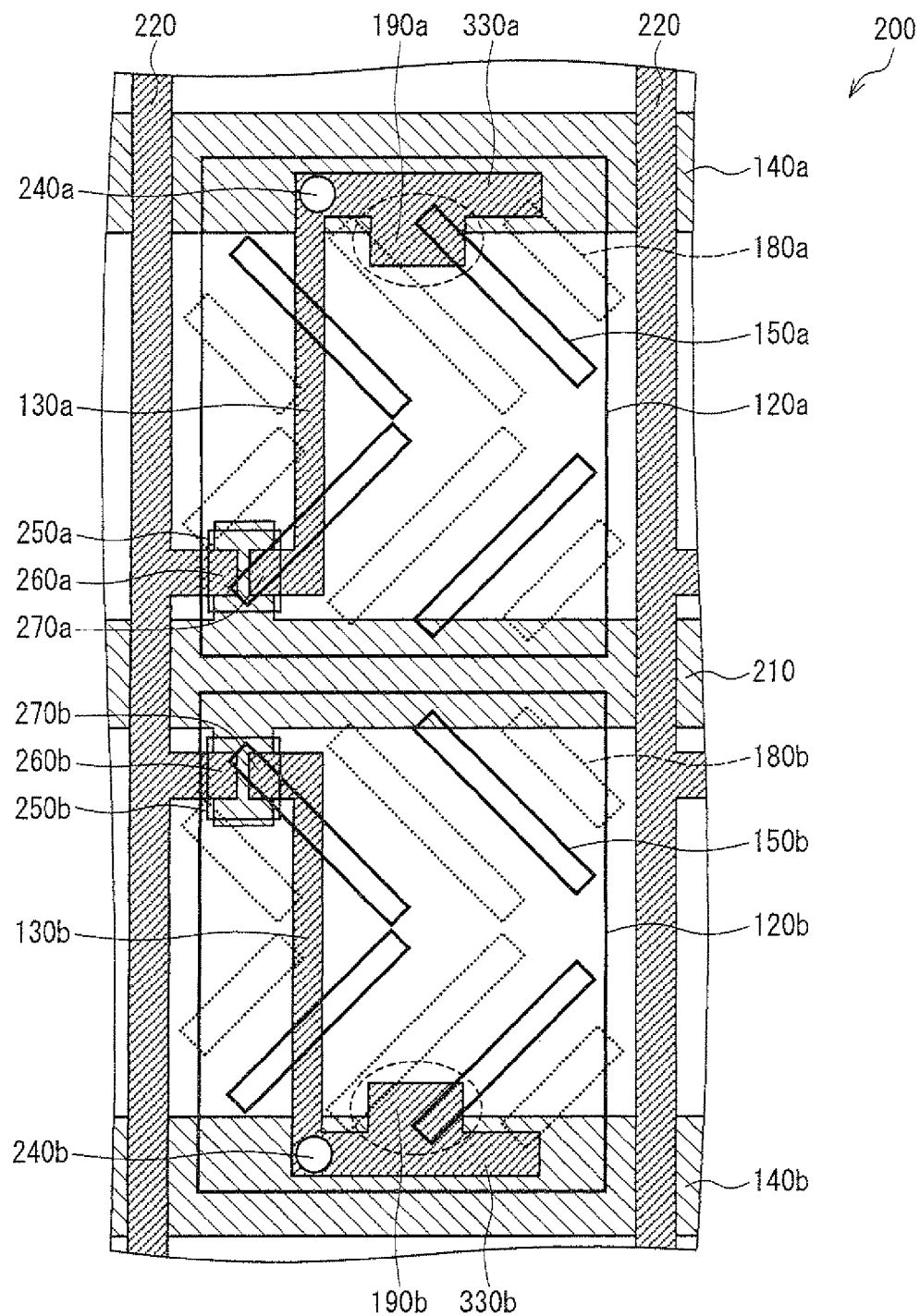
FIG. 8

First, the pixel division method is described. FIG. 8 shows the configuration of a liquid crystal display panel 200 having a multi-pixel structure. As shown in FIG. 8, the liquid crystal display panel 200 includes: data signal lines 220 and scanning signal lines 220, which are orthogonal to each other; auxiliary capacitor lines 140a and 140b; and pixels disposed in a matrix manner.

Each of the pixels is provided at an intersection between its corresponding one of the data signal lines 220 and its corresponding one of the scanning signal line 210, and includes subpixel electrodes (pixel electrode sections) 120a and 120b and TFTs 250a and 250b. The auxiliary capacitor lines 140a and 140b are disposed in such a way as to pass transversely along the upper edge of the subpixel electrode 120a and the lower edge of the subpixel electrode 120b, respectively. Moreover, the scanning signal line 210 extends in parallel with the auxiliary capacitor lines 140a and 140b in such a way as to overlap the space between the subpixel electrodes 120a and 120b disposed one above the other.

The TFT 250a is provided in a corner portion of the subpixel electrode 120a proximate to the point of intersection between the data signal line 220 and the scanning signal line 210. A drain line 130a extends along the data signal line 220 up to the auxiliary capacitor line 140a, and, further includes an auxiliary capacitor electrode section 330a that overlaps the auxiliary capacitor line 140a.

Further, in the auxiliary capacitor electrode section 330a, the drain line 130a is electrically connected to the subpixel electrode 120a through a contact hole 240a.

Similarly, the TFT 250b is provided in a corner portion of the subpixel electrode 120b proximate to the point of intersection between the data signal line 220 and the scanning signal line 210. A drain line 130b extends along the data signal line 220 up to the auxiliary capacitor line 140b, and further includes an auxiliary capacitor electrode section 330b that overlaps the auxiliary capacitor line 140b.

Further, in the auxiliary capacitor electrode section 330b, the drain line 130b is electrically connected to the subpixel electrode 120b through a contact hole 240b.

Thus, the subpixel electrodes 120a and 120b form capacitors with the auxiliary capacitor lines 140a and 140b, respectively, and also form capacitors with the common electrode. Further, the TFTs 250a and 250b have their gate electrodes electrically connected to the scanning signal line 210, and their source electrodes 260a and 260b to the data signal lines 220.

The TFTs 250a and 250b carry out a switching operation in accordance with a scanning signal supplied from the scanning signal line 210 to switch the pixel electrodes 120a and 120b and the data signal line 220 between a conducting state and a non-conducting state. Moreover, in the conducting state, voltages corresponding to a data signal representing an image supplied from the data signal line 220 are supplied to the pixel electrode 120a and 120b through the drain lines 130a and 130b, respectively.

In the liquid crystal display panel 200, the subpixel electrodes 120a and 120b are supplied with voltages corresponding to the same data signal from the data signal line 220. However, by controlling the voltages of the auxiliary capacitor lines 140a and 140b individually, the subpixel electrodes 120a and 120b can be made different in effective voltage through the auxiliary capacitors between the subpixel electrodes and the auxiliary capacitor lines.

For example, the voltages of the auxiliary capacitor lines 140a and 140b are individually controlled by voltage-reversing the auxiliary capacitor lines 140a and 140b every horizontal scanning period such that when the auxiliary capacitor line 140a level-shifts in voltage in a plus direction, the auxiliary capacitor line 140b level-shifts in voltage in a minus direction, and that when, after one horizontal scanning period, the auxiliary capacitor line 140a level-shifts in voltage in a minus direction, the auxiliary capacitor line 140b level-shifts in voltage in a plus direction. That is, by supplying the auxiliary capacitor lines 140a, and 140b with rectangular waves that are out of phase by 180 degrees, the subpixel electrodes 120a and 120b are made different in potential due to the capacitor formed by the subpixel electrode 120a and the auxiliary capacitor line 140a and the capacitor formed by the subpixel electrode 120b and the auxiliary capacitor line 140b.

Thus, in a liquid crystal display panel of the multi-pixel structure, a halftone can be expressed by composing each pixel of a high-luminance subpixel (bright subpixel) and a low-luminance subpixel (dark subpixel), whereby the dependence of gamma characteristics on viewing angles (e.g., excess brightness) is improved.

Figure 9:
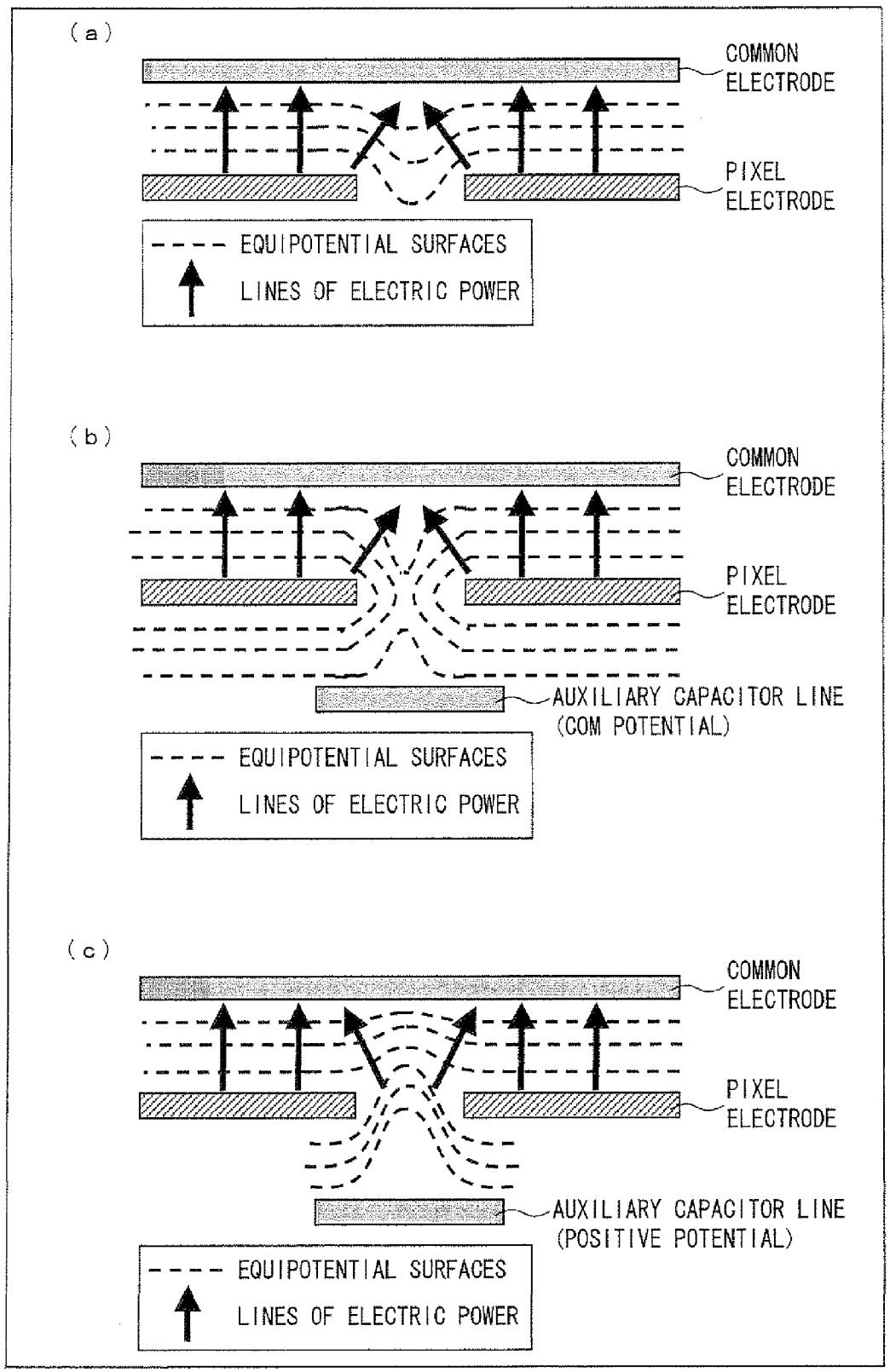
FIG. 9

However, in a liquid crystal display panel of the multi-pixel structure having its subpixel electrodes provided with slits, such equipotential lines as those shown in (c) of FIG. 9 appear due to the relationship among the common electrode, the subpixel electrodes, and the auxiliary capacitor lines not only at the PSA step in the process of manufacturing the liquid crystal display panel but also during actual driving according to the pixel division method. Therefore, even during actual driving, there may occur a defect in alignment of liquid crystal molecules, and such a defect in alignment ends up causing deterioration in display quality.

Accordingly, in the liquid crystal display panel 200 having a multi-pixel structure, as shown in FIG. 8, in a region of intersection (surrounded by a dotted line) between the open region of a slit 150a provided in the subpixel electrode 120a and the auxiliary capacitor line 140, the drain line 130a has a covering section 190a, provided between the layer of the pixel electrode 120a and the layer of the auxiliary capacitor line 140a, which covers the auxiliary capacitor line 140a. In other words, the drain line 130a has a covering section 190 stretching from the auxiliary capacitor electrode section 330a in such a way as to cover the region of intersection between the open region of the slit 150a and the auxiliary capacitor line 140a.

Similarly, in a region of intersection (surrounded by a dotted line) between the open region of a slit 150b provided in the subpixel electrode 120b and the auxiliary capacitor line 140b, the drain line 130b has a covering section 190b, provided between the layer of the pixel electrode 120b and the layer of the auxiliary capacitor line 140b, which covers the auxiliary capacitor line 140b.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be applied to a liquid crystal display panel including a substrate structured such that a slit in a pixel electrode intersects with a scanning signal line or an auxiliary capacitor line and, in particular, is suitable to a liquid crystal display device in which a pretilt angle of liquid crystal molecules are formed through a PSA step under a Cs-COM voltage application scheme.

REFERENCE SIGNS LIST

1 Liquid crystal display device
2 Liquid crystal display panel
3 Control circuit
4 Gate driving circuit
5 Source driving circuit
6 CS driving circuit
7 Pixel
10 Active matrix substrate
11 Transparent insulating substrate 12 Pixel electrode (pixel electrode section)
13 Drain line (metal wire)
14 Auxiliary capacitor wire
15 Slit (alignment control space section)
16 Transparent insulating substrate
17 Common electrode
18 Rib (alignment control section)
19 Covering metal section (metal layer, covering section)
20 Counter substrate
21 Scanning signal line
22 Data signal line (signal wire)
24 Contact hole
25 TFT (switching element)
26 Source electrode
27 Drain electrode
30 Liquid crystal layer
31 Interlayer insulating film
32 Gate insulating film
33 Glass substrate

The invention claimed is:

1. An active matrix substrate comprising:
a plurality of scanning signal lines;
a plurality of signal wires disposed in such a way as to intersect with the scanning signal lines;
a pixel section constituted by pixel electrode sections each provided in correspondence with a combination of each of the scanning signal lines and each of the signal wires, the pixel section having an alignment control space section that controls a state of alignment of liquid crystal molecules;
a switching element that switches a signal wire as one of the signal wires and a pixel electrode section as one of the pixel electrode sections into a conducting state or a non-conducting state in accordance with a scanning signal supplied from a scanning signal line as one of the scanning signal lines; and
a metal wire, connected to the switching element, through which when the switching element is in a conducting state, a data signal from the signal wire is supplied to the pixel electrode section,
in a region of intersection between the alignment control space section and the scanning signal line, a metal layer being provided between a layer of the pixel section and a layer of the scanning signal line in such a way as to cover at least the scanning signal line.

2. The active matrix substrate as set forth in claim 1, wherein the metal layer is constituted to include at least either the metal wire or the signal wire.

3. The active matrix substrate as set forth in claim 1, wherein the alignment control space section is a long narrow hole formed individually in the pixel electrode section.

4. The active matrix substrate as set forth in claim 1, wherein the alignment control space section is a space formed between one and another of the plurality of pixel electrode sections constituting the pixel section.

5. The active matrix substrate as set forth in claim 1, wherein the alignment control space section is a long narrow hole formed by making a cut in the pixel electrode section.

6. The active matrix substrate as set forth in claim 1, wherein the pixel electrode section is a multi-pixel electrode including a plurality of subpixel electrodes and is driven by a pixel division method.

7. The active matrix substrate as set forth in claim 1, further comprising an auxiliary capacitor line that forms a capacitor with the pixel electrode section, wherein in a region of intersection between the alignment control space section and the auxiliary capacitor line, the metal layer is provided between a layer of the pixel section and a layer of the auxiliary capacitor line in such a way as to cover at least the auxiliary capacitor line.

8. The active matrix substrate as set forth in claim 7, wherein in the region of intersection between the alignment control space section and the auxiliary capacitor line, a drain line serving as the metal wire and extending from the switching element formed in a corner portion of the pixel electrode section to the auxiliary capacitor line disposed in such a way as to pass transversely across the pixel electrode section is provided with a covering section that covers at least the auxiliary capacitor line.

9. The active matrix substrate as set forth in claim 7, wherein:
the scanning signal line is disposed in such a way as to pass transversely across the pixel electrode section;
the auxiliary capacitor line is disposed in such a way as to pass transversely across the pixel electrode section substantially in parallel with the scanning signal line;
a drain line serving as the metal wire extends from the switching element formed in the pixel electrode section to at least either the region of intersection between the alignment control space section and the auxiliary capacitor line disposed in such a way as to pass transversely across the pixel electrode section or the region of intersection between the alignment control space section and the scanning signal line; and
a covering section that covers at least the auxiliary capacitor line and the scanning signal line in the respective regions is provided as part of the drain line.

10. The active matrix substrate as set forth in claim 7, wherein:
the scanning signal line is disposed in such a way as to pass transversely along an edge of the pixel electrode section;
the auxiliary capacitor line is disposed in such a way as to pass transversely across a center of the pixel electrode section substantially in parallel with the scanning signal line; and
a drain line serving as the metal wire and extending from the switching element formed in a corner portion of the pixel electrode section to at least either the region of intersection between the alignment control space section and the auxiliary capacitor line disposed in such a way as to pass transversely across the pixel electrode section or the region of intersection between the alignment control space section and the scanning signal line is provided with a covering section that covers at least the auxiliary capacitor line and the scanning signal line in the respective regions.

11. The active matrix substrate as set forth in claim 10, wherein the pixel electrode section has its longer sides extending substantially in parallel with the scanning signal line.

12. The active matrix substrate as set forth in claim 7, wherein:
the scanning signal line is disposed in such a way as to pass transversely across a center of the pixel electrode section;
the auxiliary capacitor line is disposed in such a way as to pass transversely along an edge of the pixel electrode section substantially in parallel with the scanning signal line; and
a drain line serving as the metal wire and extending from the switching element formed in a side edge portion of the pixel electrode section to at least either the region of intersection between the alignment control space section and the auxiliary capacitor line disposed in such a way as to pass transversely across the pixel electrode section or the region of intersection between the alignment control space section and the scanning signal line is provided with a covering section that covers at least the auxiliary capacitor line and the scanning signal line in the respective regions.

13. The active matrix substrate as set forth in claim 12, wherein the pixel electrode section has its longer sides extending substantially in parallel with the scanning signal line.

14. The active matrix substrate as set forth in claim 7, wherein:
the auxiliary capacitor line is provided in such a way as to overlap a site where another alignment control space section adjoining the alignment control space section within each of the pixel electrode sections are close to the alignment control space section at a sharp angle; and
in the region of intersection between the auxiliary capacitor line and those of the other alignment control space section and the alignment control space section, a drain line serving as the metal wire and extending from the switching element formed in a corner portion of the pixel electrode section to the auxiliary capacitor line is provided with a covering section that covers at least the auxiliary capacitor line.

15. The active matrix substrate as set forth in claim 7, wherein:
the auxiliary capacitor line is provided in such a way as to pass transversely across the alignment control space section formed as a space between the plurality of pixel electrode sections; and
in the region of intersection between the alignment control space section and the auxiliary capacitor line, a drain line serving as the metal wire and extending from the switching element formed in a corner portion of the pixel electrode section to the auxiliary capacitor line is provided with a covering section that covers at least the auxiliary capacitor line.

16. The active matrix substrate as set forth in claim 7, wherein:
the auxiliary capacitor line is provided in such a way as to pass transversely across the alignment control space section formed as a space between the plurality of pixel electrode sections; and
in the region of intersection between the alignment control space section and the auxiliary capacitor line, a data signal line serving as the signal line and extending from the switching element formed in a corner portion of the pixel electrode section in such a way as to intersect with the auxiliary capacitor line is provided with a covering section that covers at least the auxiliary capacitor line.

17. The active matrix substrate as set forth in claim 1, wherein in the region of intersection between the alignment control space section and the scanning signal line, a drain line serving as the metal wire and extending from the switching element formed in the pixel electrode section to the scanning signal line disposed in such a way as to pass transversely across the pixel electrode section is provided with a covering section that covers at least the scanning signal line.

18. A liquid crystal display panel comprising:
an active matrix substrate as set forth in claim 1;
a counter substrate provided with a common electrode; and
a liquid crystal layer sandwiched between the active matrix substrate and the counter substrate.

19. The liquid crystal display panel as set forth in claim 18, wherein the counter substrate includes an alignment control section that controls a state of alignment of liquid crystal molecules.

20. A liquid crystal display device comprising:
a liquid crystal display panel as set forth in claim 18; and
a driving circuit that drives the liquid crystal display panel.

21. The active matrix substrate as set forth in 1, wherein a potential of the metal layer is set so that any one of the following states of potentials is formed:
(1) a first state of potential where a potential difference obtained by subtracting a potential of the common electrode, which is provided on a substrate opposite the active matrix substrate, from a potential of the metal layer is opposite In polarity to a potential difference obtained by subtracting the potential of the common electrode from a potential of the pixel electrode section;
(2) a second state of potential where the potential of the metal layer is equal to the potential of the common electrode; and
(3) a third state of potential wherein the potential difference obtained by subtracting the potential of the common electrode from the potential of the metal layer is equal in polarity to the potential difference obtain by subtracting the potential of the common electrode from the potential of the pixel electrode section and where an absolute value of a difference between the potential of the electrode section and the potential of the common electrode is greater than or equal to an absolute value of a difference between the potential of the metal layer and the potential of the common electrode.

22. A method for manufacturing an active matrix substrate including (i) a plurality of scanning signal lines, (ii) a plurality of signal wires disposed in such a way as to intersect with the scanning signal lines, (iii) a pixel section constituted by pixel electrode sections each provided in correspondence with a combination of each of the scanning signal lines and each of the signal wires, the pixel section having an alignment control space section that controls a state of alignment of liquid crystal molecules, (iv) a switching element that switches a signal wire as one of the signal wires and a pixel electrode section as one of the pixel electrode sections into a conducting state or a non-conducting state in accordance with a scanning signal supplied from a scanning signal line as one of the scanning signal lines, and (v) a metal wire, connected to the switching element, through which when the switching element is in a conducting state, a data signal from the signal wire is supplied to the pixel electrode section,
the method comprising the step of, in a region of intersection between the alignment control space section and the scanning signal line, forming a metal layer between a layer of the pixel section and a layer of the scanning signal line in such a way that the metal layer covers at least the scanning signal line.

23. A method for manufacturing a liquid crystal display panel as set forth in claim 22,
the method comprising a polymer alignment supporting step of giving a pretilt angle to liquid crystal molecules of the liquid crystal layer by polymerizing monomers mixed in advance into the liquid crystal layer, with voltage being applied to the liquid crystal layer in any one of the following states of potential: a first state of potential where a potential difference obtained by subtracting a potential of the common electrode from a potential of the metal layer is opposite in polarity to a potential difference obtained by subtracting the potential of the common electrode from a potential of the pixel electrode section; a second state of potential where the potential of the metal layer is equal to the potential of the common electrode; and a third state of potential where the potential difference obtained by subtracting the potential of the common electrode from the potential of the metal layer is equal in polarity to the potential difference obtained by subtracting the potential of the common electrode from the potential of the pixel electrode section and where an absolute value of a difference between the potential of the pixel electrode section and the potential of the common electrode is greater than or equal to an absolute value of a difference between the potential of the metal layer and the potential of the common electrode.

24. A method for driving a liquid crystal display panel as set forth in claim 22, the method comprising applying voltage to the liquid crystal layer in any one of the following states of potential: a first state of potential where a potential difference obtained by subtracting a potential of the common electrode from a potential of the metal layer is opposite in polarity to each other a potential difference obtained by subtracting the potential of the common electrode from a potential of the pixel electrode section; a second state of potential where the potential of the metal layer is equal to the potential of the common electrode; and a third state of potential where the potential difference obtained by subtracting the potential of the common electrode from the potential of the metal layer is equal in polarity to the potential difference obtained by subtracting the potential of the common electrode from the potential of the pixel electrode section and where an absolute value of a difference between the potential of the pixel electrode section and the potential of the common electrode is greater than or equal to an absolute value of a difference between the potential of the metal layer and the potential of the common electrode.

25. The method as set forth in claim 22, wherein the active matrix substrate further comprises an auxiliary capacitor line that forms a capacitor with the pixel electrode section, the method further comprising, in a region of intersection between the alignment control space section and the auxiliary capacitor line, forming the metal layer between a layer of the pixel section and a layer of the auxiliary capacitor line in such a way as to cover at least the auxiliary capacitor line.

* * * * *